United States Patent
Yamaura et al.

(10) Patent No.: US 12,314,456 B2
(45) Date of Patent: May 27, 2025

(54) COMMUNICATION CONTROL DEVICE, COMMUNICATION DEVICE, AND COMMUNICATION SYSTEM

(71) Applicant: KABUSHIKI KAISHA TOSHIBA, Tokyo (JP)

(72) Inventors: Takahiro Yamaura, Kawasaki (JP); Yuta Kobayashi, Ota (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 18/459,559

(22) Filed: Sep. 1, 2023

(65) Prior Publication Data
US 2024/0273244 A1 Aug. 15, 2024

(30) Foreign Application Priority Data
Feb. 9, 2023 (JP) ................. 2023-018483

(51) Int. Cl.
G06F 12/00 (2006.01)
G06F 21/79 (2013.01)
G06F 21/82 (2013.01)

(52) U.S. Cl.
CPC .............. G06F 21/79 (2013.01); G06F 21/82 (2013.01)

(58) Field of Classification Search
CPC .................. G06F 21/79; G06F 21/82
See application file for complete search history.

(56) References Cited

U.S. PATENT DOCUMENTS

| | | | |
|---|---|---|---|
| 8,788,726 B2 | 7/2014 | Tanaka et al. | |
| 9,544,370 B2 | 1/2017 | Tanaka et al. | |
| 11,506,717 B1* | 11/2022 | Maraaba | G01H 3/08 |
| 2012/0089842 A1* | 4/2012 | Yao | H04L 9/3242 |
| | | | 713/175 |
| 2013/0070925 A1* | 3/2013 | Yamada | H04L 9/08 |
| | | | 380/255 |
| 2015/0341348 A1* | 11/2015 | Yang | H04L 63/0428 |
| | | | 726/9 |

(Continued)

FOREIGN PATENT DOCUMENTS

| | | | | |
|---|---|---|---|---|
| CN | 105515766 A | * | 4/2016 | ........... H04L 9/0852 |
| CN | 116089358 A | * | 6/2022 | |

(Continued)

*Primary Examiner* — Tim T Vo
*Assistant Examiner* — Mohammad S Hasan
(74) *Attorney, Agent, or Firm* — Oblon, McClelland, Maier & Neustadt, L.L.P.

(57) ABSTRACT

According to one embodiment, a communication control device included in a first communication device is provided. The communication control device includes an acquisition unit, a first processing unit, a request unit and a first memory unit. The acquisition unit acquires data transmitted from the first communication device to a second communication device or data transmitted from the second communication device to the first communication device. The first processing unit performs an encryption process or a decryption process on the data by using key data in a case where the data belongs to a flow. The request unit requests transfer of key data for each flow via an internal bus. The first memory unit stores the key data transferred in response to the request.

13 Claims, 33 Drawing Sheets

(56) References Cited

U.S. PATENT DOCUMENTS

| | | | |
|---|---|---|---|
| 2016/0014100 A1* | 1/2016 | Matsuo | H04L 63/0435 |
| | | | 713/169 |
| 2020/0274865 A1* | 8/2020 | Araújo | H04W 12/04 |
| 2022/0222461 A1* | 7/2022 | Mann | H04L 63/105 |

FOREIGN PATENT DOCUMENTS

| | | | | | |
|---|---|---|---|---|---|
| CN | 110809760 B | * | 9/2022 | | G06F 11/3006 |
| CN | 116095114 A | * | 5/2023 | | G06F 21/602 |
| CN | 110786033 B | * | 6/2023 | | G06F 1/163 |
| EP | 2693352 A1 | * | 2/2014 | | G06F 19/322 |
| EP | 3 541 007 A1 | | 9/2019 | | |
| JP | 2003008740 A | * | 1/2003 | | H04M 3/42 |
| JP | 2005311456 A | * | 11/2005 | | |
| JP | 5204195 B2 | | 6/2013 | | |
| JP | 2013236185 A | * | 11/2013 | | |
| JP | 5465335 B2 | | 4/2014 | | |
| JP | 5611889 B2 | | 10/2014 | | |
| JP | 2015130623 A | * | 7/2015 | | G06N 99/002 |
| JP | 2019-161557 A | | 9/2019 | | |
| KR | 20120089842 A | * | 8/2010 | | |
| WO | WO-2005027403 A1 | * | 3/2005 | | G06F 21/755 |
| WO | WO-2016047111 A1 | * | 3/2016 | | G06F 21/56 |

\* cited by examiner

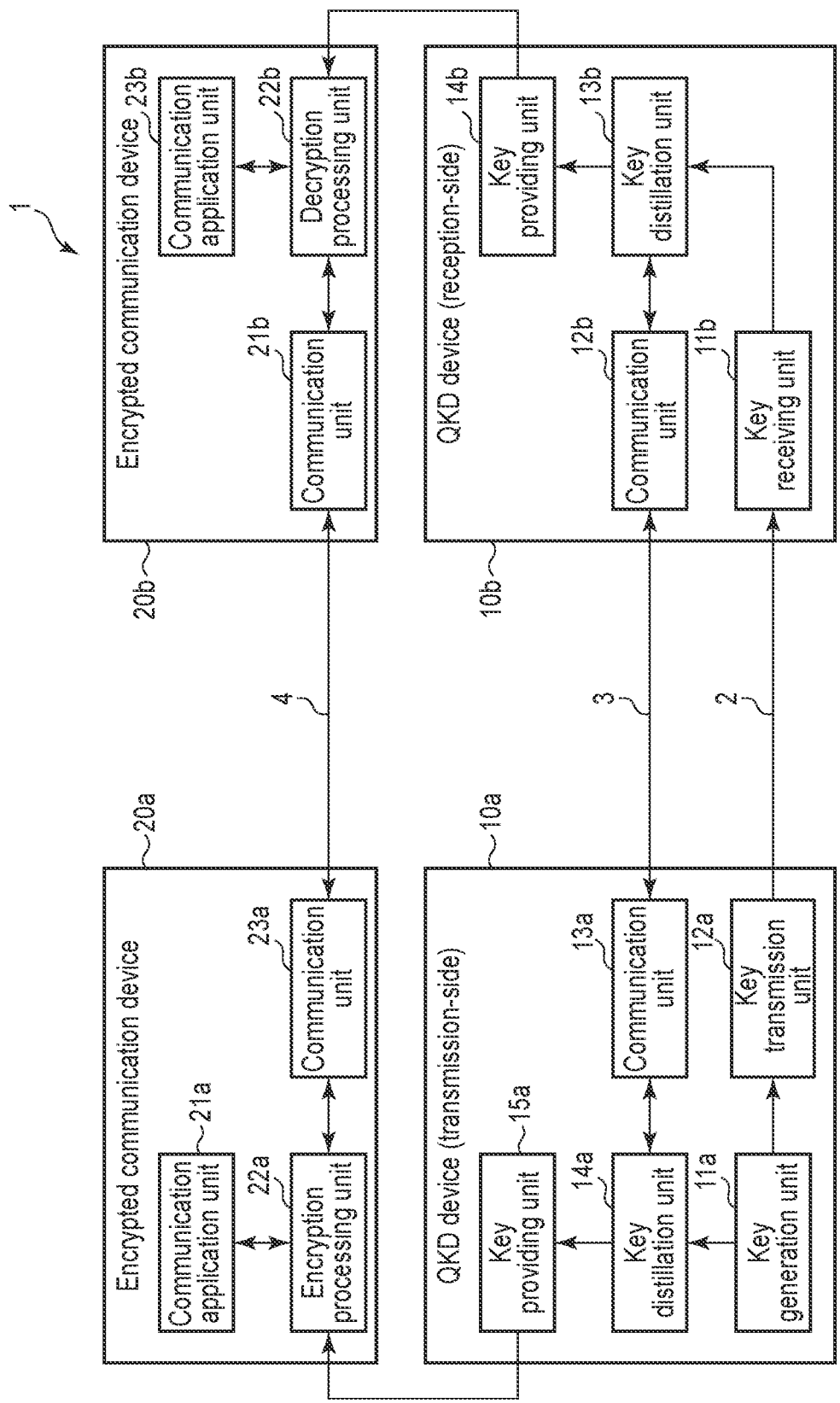
F I G. 1

| Flow identifier | Priority | QKD key index | QKD key identifier | Address | Length | Transferred data size |
|---|---|---|---|---|---|---|
| 0 | 7 | 0 | AAAA | 0x00000000 | 100000000000 | 34242133 |
| | | 1 | AAAB | 0x01000000 | 100000000000 | 0 |
| | | ... | ... | ... | ... | ... |
| 1 | 6 | 0 | BBBA | 0x02000000 | 100000000000 | 1120930 |
| | | 1 | BBBB | 0x03000000 | 100000000000 | 0 |
| | | ... | ... | ... | ... | ... |
| ... | ... | | | | | |

F I G. 5

| Flow identifier | Encryption method | Write position | Read position | Number of circulations | Buffer size |
|---|---|---|---|---|---|
| 0 | L2 encryption/OTP | 0x00000 | 0x005EE | 0 | 128KiB |
| 1 | L3 encryption/OTP | 0x10000 | 0x1287C | 23 | 128KiB |
| ... | ... | ... | ... | ... | ... |
| 127 | — | 0x00000 | 0x0943E | 345 | 128KiB |

F I G. 6

| Flow identifier | Flow identification method | Flow identification parameter |
|---|---|---|
| 0 | 1 : Identification by destination MAC address and VLAN ID | MAC address : AA-BB-CC-DD-EE-01<br>VLAN ID : 10 |
| 1 | 2 : Identification by transmission source MAC address and VLAN ID | MAC address : AA-BB-CC-DD-EE-02<br>VLAN ID : 20 |
| ... | ... | ... |

F I G. 12

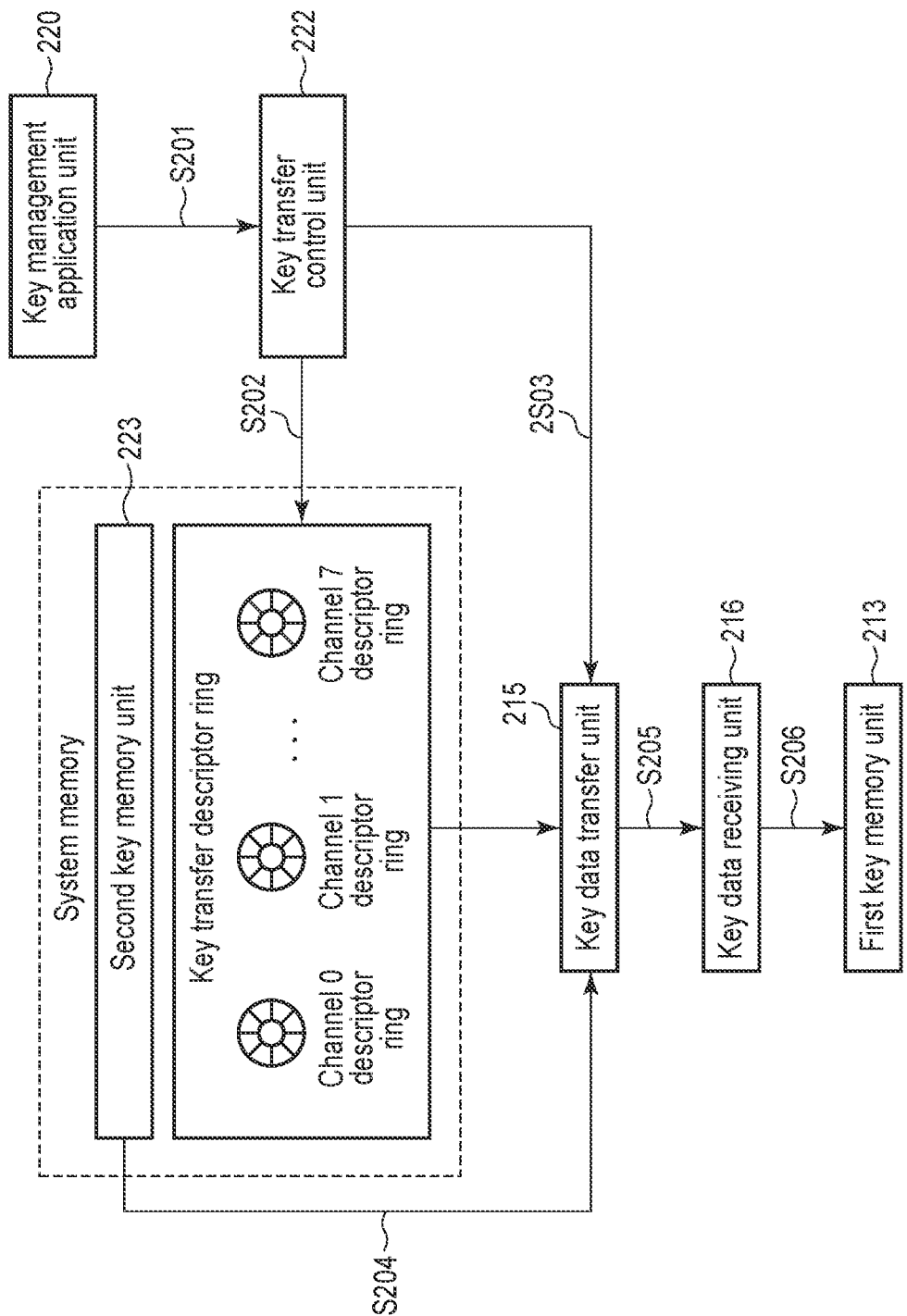
F I G. 14

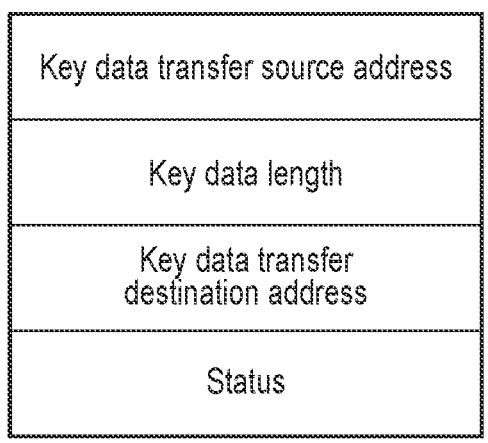
F I G. 15

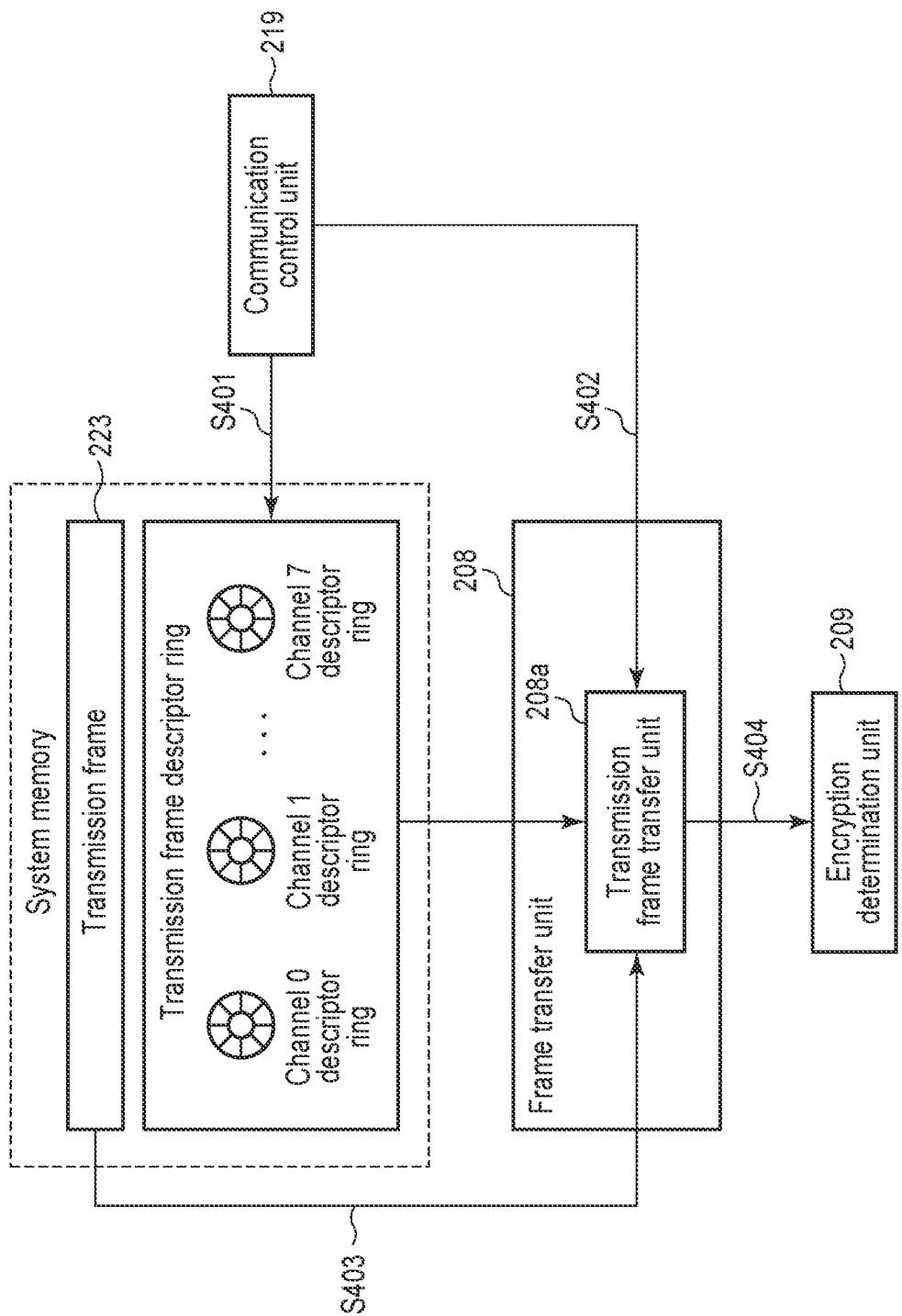
F I G. 17

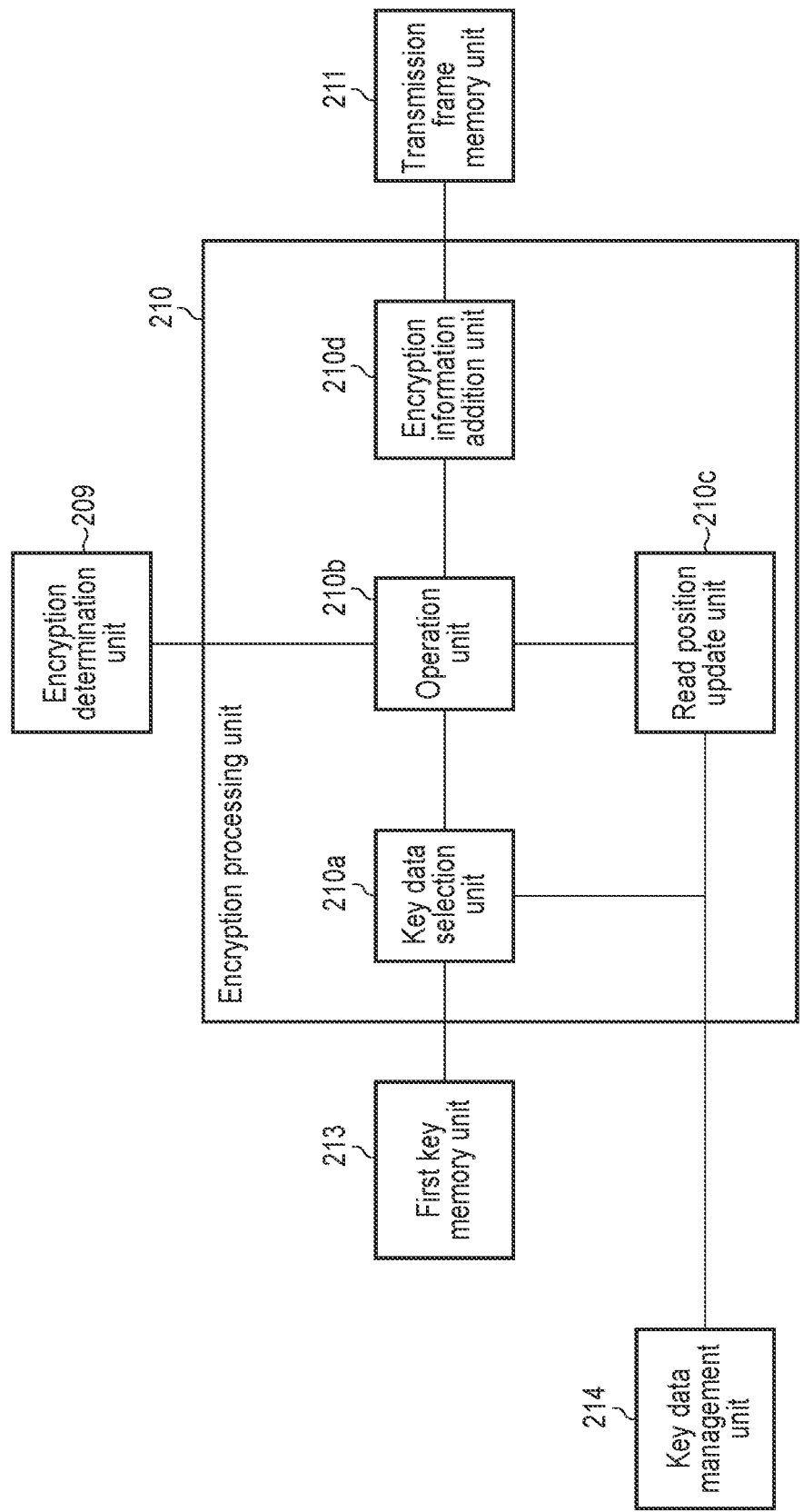
F I G. 20

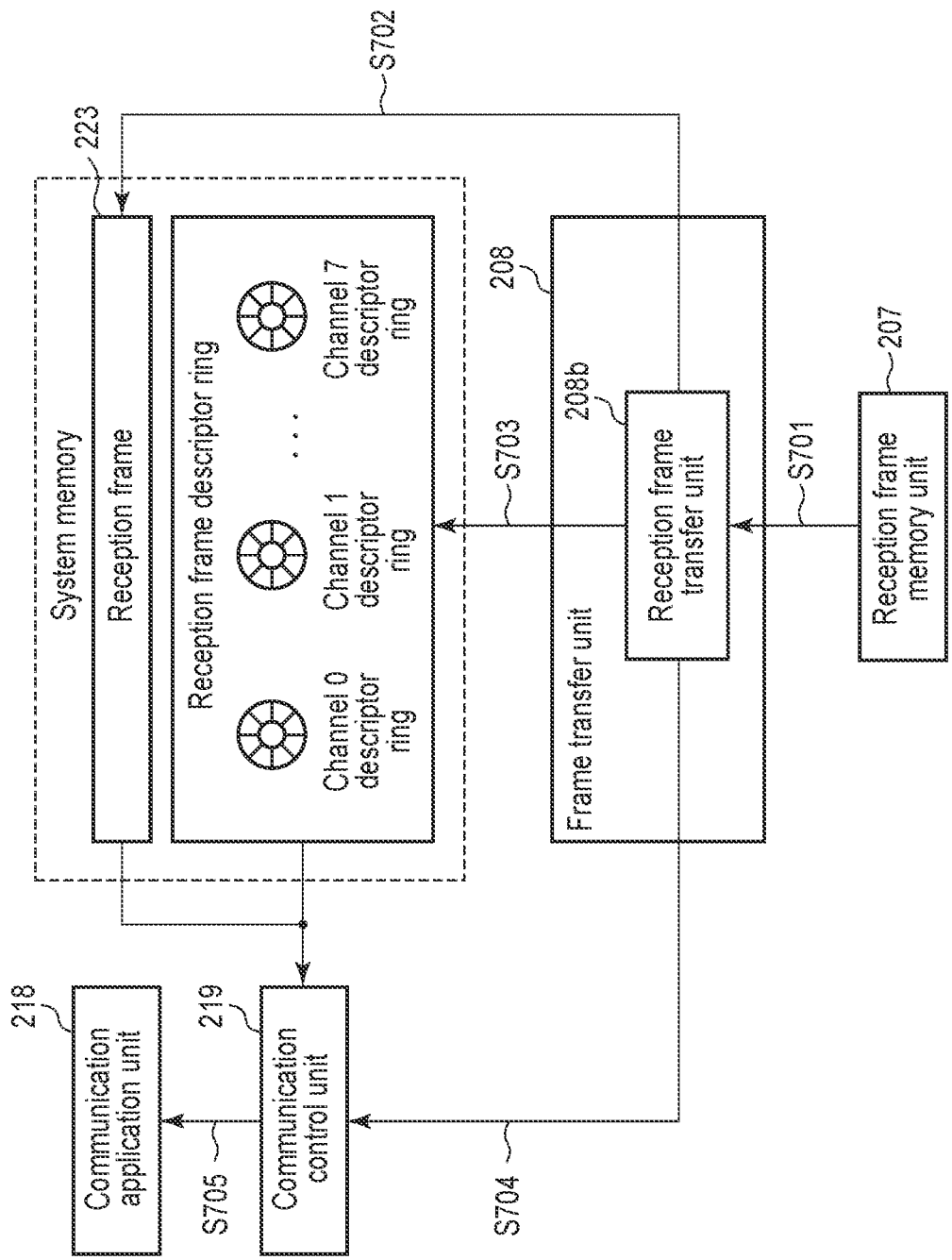
F I G. 23

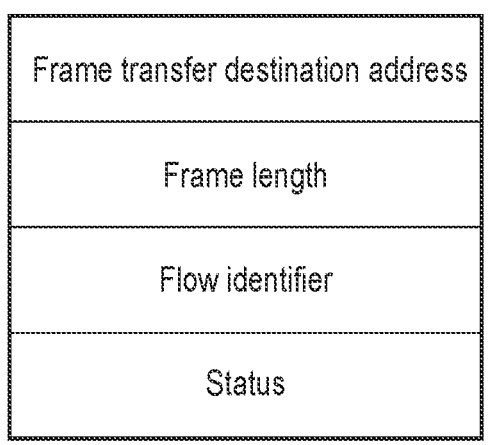
F I G. 24

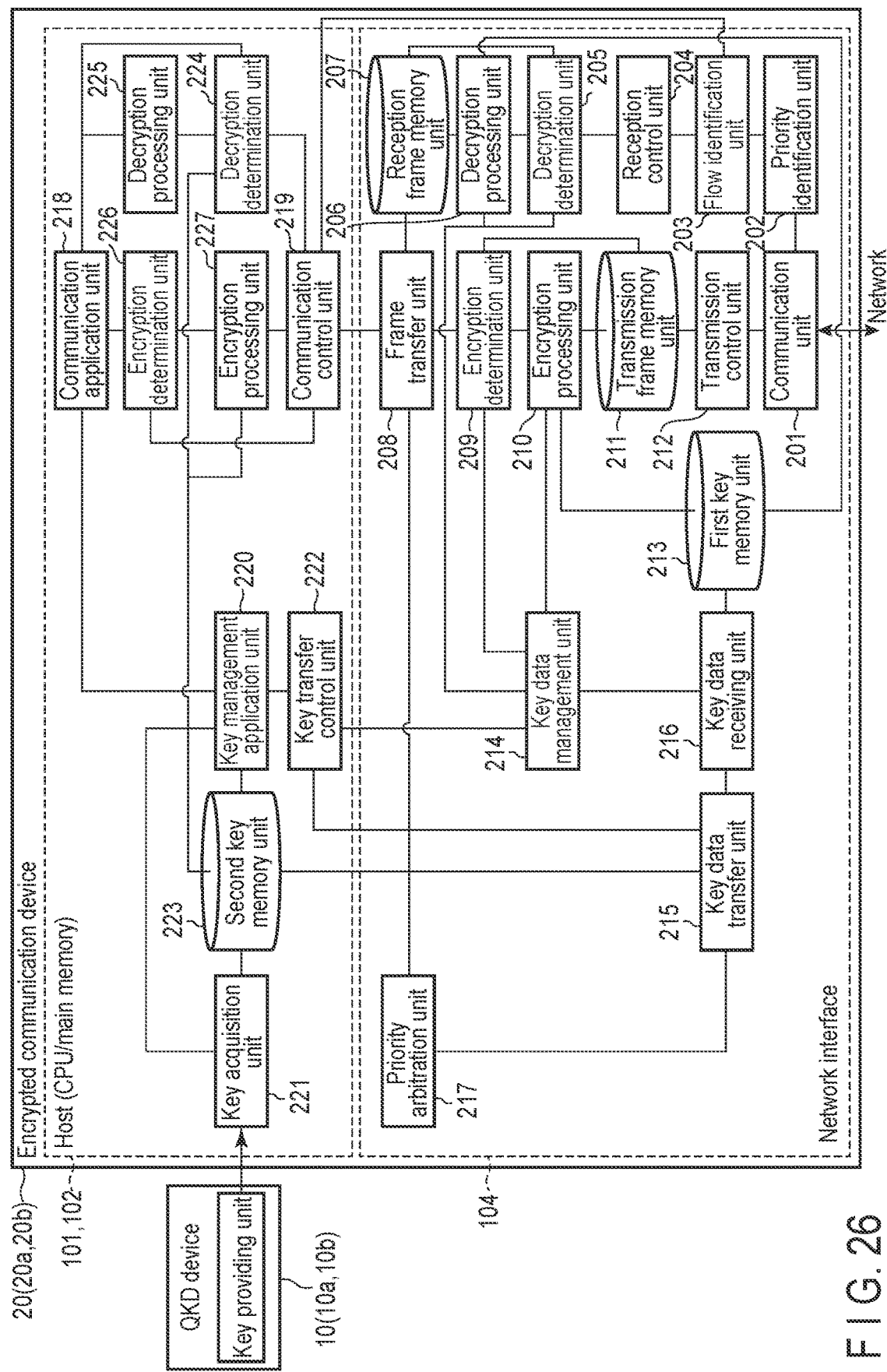
F I G. 26

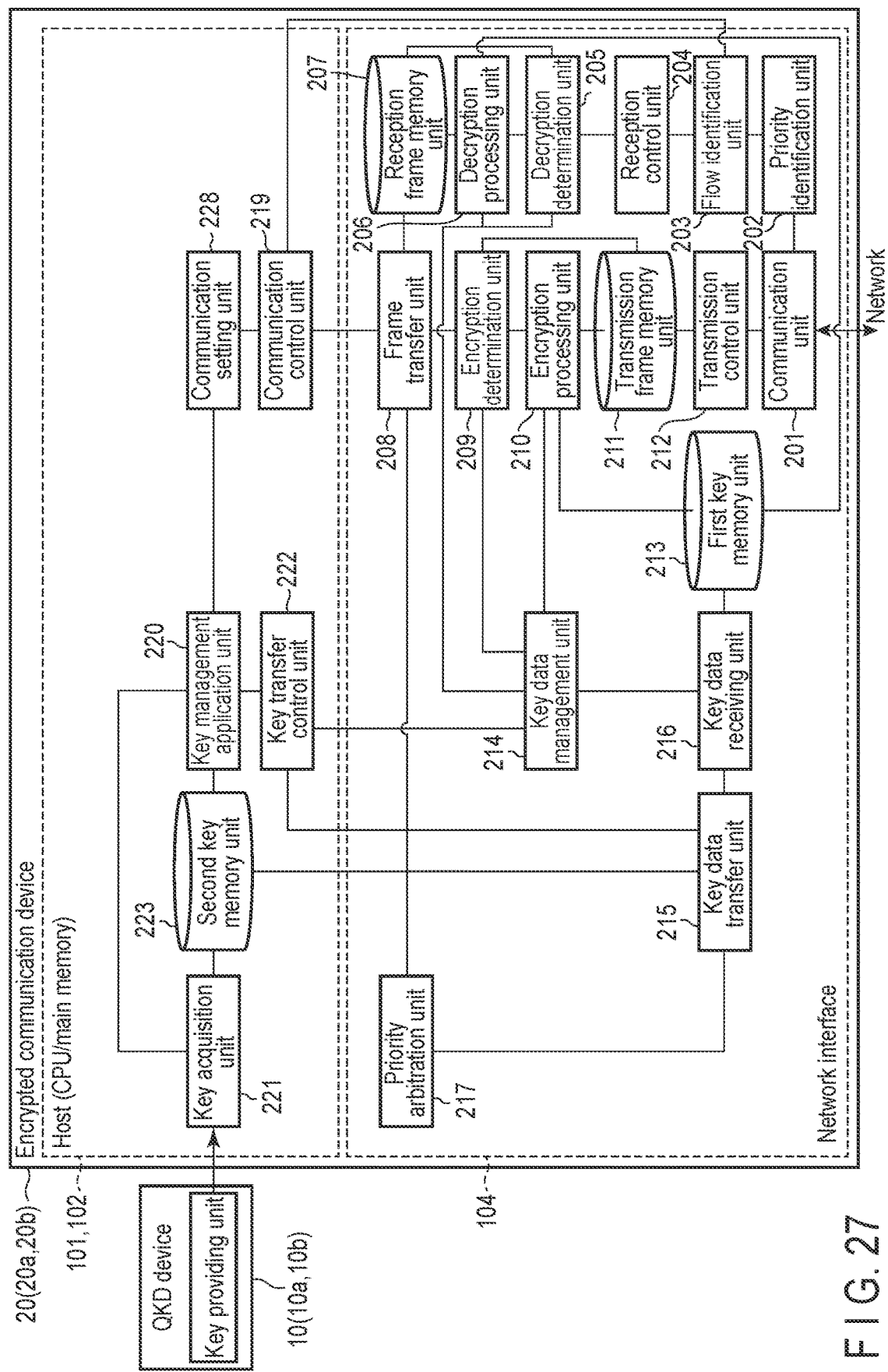
F I G. 27

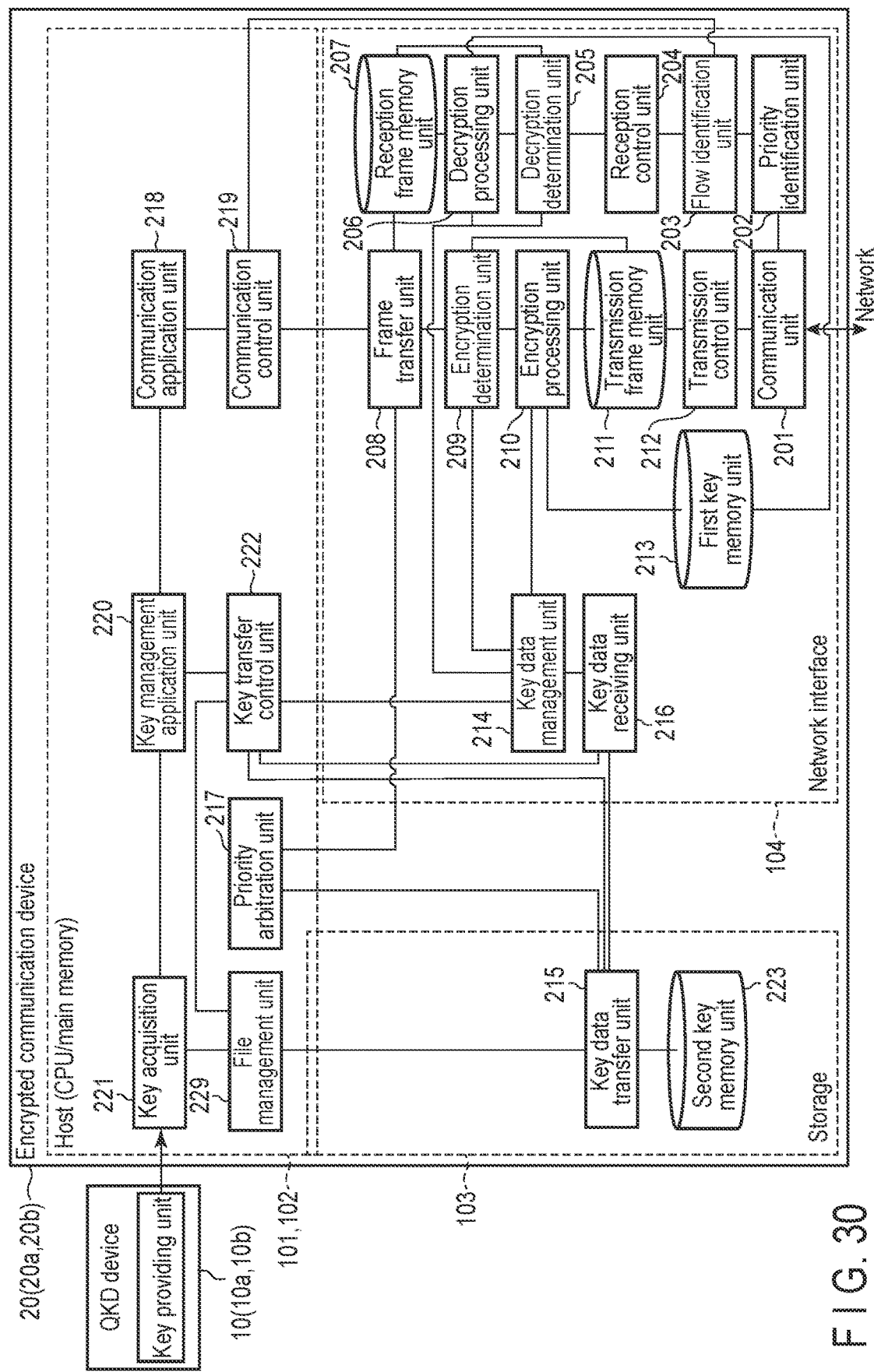
F I G. 30

| Flow identifier | Priority | QKD key index | QKD key identifier | File name | Length | Transferred data size |
|---|---|---|---|---|---|---|
| 0 | 7 | 0 | AAAA | AAAA.dat | 100000000000 | 34242133 |
| | | 1 | AAAB | AAAB.dat | 100000000000 | 0 |
| | | ... | ... | ... | ... | ... |
| 1 | 6 | 0 | BBBA | BBBA.dat | 100000000000 | 1120930 |
| | | 1 | BBBB | BBBB.dat | 100000000000 | 0 |
| | | ... | ... | ... | ... | ... |
| ... | ... | | | | | |

F I G. 32

| Address | Description |
|---|---|
| 0x000000 | Valid data start offset of key transfer channel 0 |
| 0x000004 | Valid data length of key transfer channel 0 |
| 0x000008 | Data write destination address of first key memory unit of key transfer channel 0 (or flow identifier) |
| 0x000010 | Valid data start offset of key transfer channel 1 |
| 0x000014 | Valid data length of key transfer channel 1 |
| 0x000018 | Data write destination address of first key storage unit of key transfer channel 1 (or flow identifier) |
| ... | ... |
| 0x000070 | Valid data start offset of key transfer channel 7 |
| 0x000074 | Valid data length of key transfer channel 7 |
| 0x000078 | Data write destination address of first key storage unit of key transfer channel 7 (or flow identifier) |
| 0x100000~0x11FFFF | Data write area of key transfer channel 0 |
| 0x120000~0x13FFFF | Data write area of key transfer channel 1 |
| ... | ... |
| 0x1E0000~0x1FFFFF | Data write area of key transfer channel 7 |

F I G. 33

COMMUNICATION CONTROL DEVICE, COMMUNICATION DEVICE, AND COMMUNICATION SYSTEM

CROSS-REFERENCE TO RELATED APPLICATIONS

This application is based upon and claims the benefit of priority from Japanese Patent Application No. 2023-018483, filed Feb. 9, 2023, the entire contents of which are incorporated herein by reference.

FIELD

Embodiments described herein relate generally to a communication control device, a communication device, a communication system, a method, and a program.

BACKGROUND

In recent years, there has been known a communication device that transmits and receives communication data by communication using quantum cryptography, which is an encryption technique based on the theory of quantum mechanics (hereinafter, denoted as quantum cryptographic communication).

In this quantum cryptographic communication, for example, a key (data) is shared between a communication device on a side transmitting communication data and a communication device on a side receiving the communication data by quantum key distribution, and the corresponding communication data is encrypted and decrypted by using the corresponding key.

By the way, in order to improve the security of communication data, an encryption communication method called one time pad (OTP) in which a key (data) used for encryption and decryption is not reused may be used.

In this case, in order to realize low-delay communication, a mechanism for smoothly switching a key in a communication control device such as a network interface provided in a communication device is required.

BRIEF DESCRIPTION OF THE DRAWINGS

FIG. 1 is a diagram illustrating an outline of a communication system according to a first embodiment.

FIG. 5 is a diagram illustrating an example of a data structure of first key management data.

FIG. 6 is a diagram illustrating an example of a data structure of second key management data.

FIG. 12 is a diagram illustrating a setting example of a flow identification unit.

FIG. 14 is a diagram illustrating an outline of transfer of key data.

FIG. 15 is a diagram illustrating an example of a descriptor entry in a key transfer descriptor ring.

FIG. 17 is a diagram illustrating an outline of transfer of a transmission frame.

FIG. 20 is a diagram illustrating an example of an internal configuration of an encryption processing unit.

FIG. 23 is a diagram illustrating an outline of transfer of a reception frame.

FIG. 24 is a diagram illustrating an example of a descriptor entry in a reception frame descriptor ring.

FIG. 26 is a diagram illustrating a first modification of the present embodiment.

FIG. 27 is a diagram illustrating a second modification of the present embodiment.

FIG. 30 is a block diagram illustrating an example of a functional configuration of an encrypted communication device according to a second embodiment.

FIG. 32 is a diagram illustrating an example of a data structure of first key management data.

FIG. 33 is a diagram illustrating an example of an interface of a key data receiving unit.

DETAILED DESCRIPTION

Figure 2:
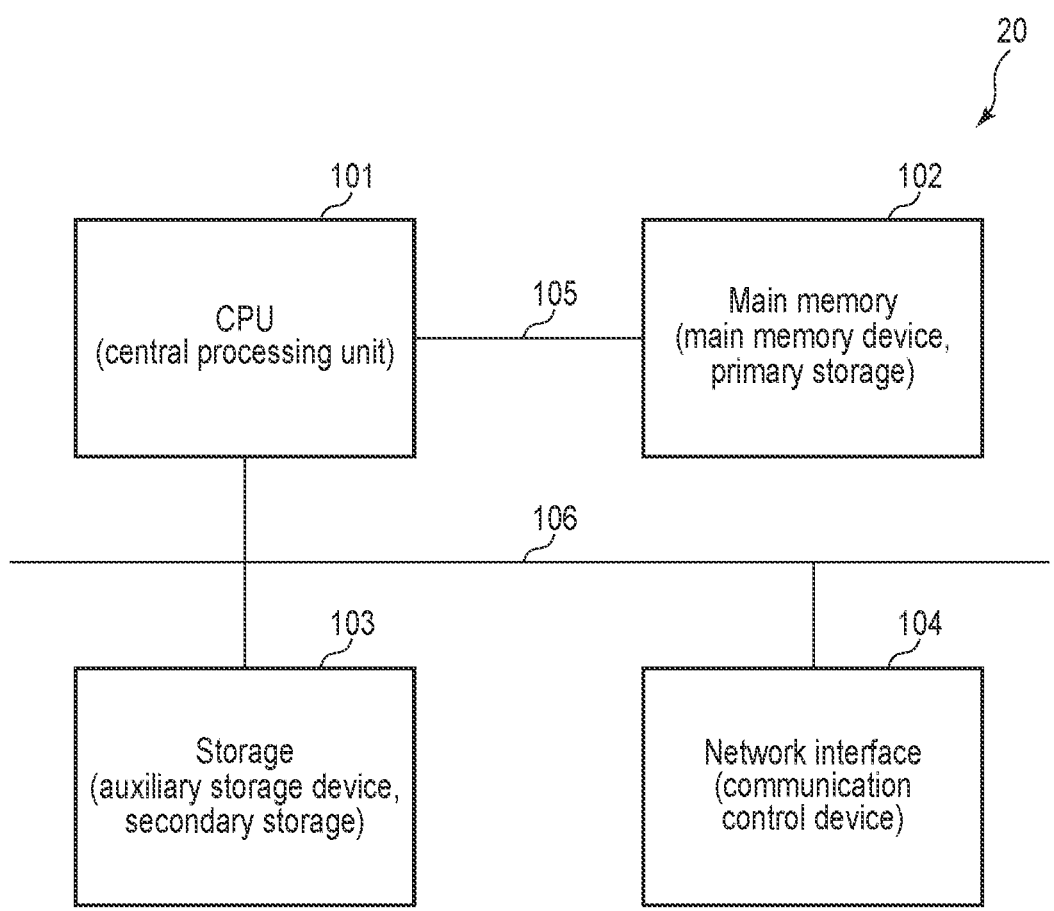
FIG. 2 is a diagram illustrating an example of a hardware configuration of an encrypted communication device.

In general, according to one embodiment, a communication control device included in a first communication device is provided. The communication control device includes an acquisition unit, a first processing unit, a request unit and a first memory unit. The acquisition unit acquires data transmitted from the first communication device to a second communication device or data transmitted from the second communication device to the first communication device, via a network. The first processing unit performs an encryption process or a decryption process on the data by using key data in a case where the data belongs to a flow to be encrypted or decrypted. The request unit requests transfer of key data for each flow via an internal bus of the first communication device. The first memory unit stores the key data transferred in response to the request.

Various embodiments will be described with reference to the accompanying drawings.

First Embodiment

First, a first embodiment is described. A communication device according to the present embodiment is configured to transmit and receive communication data by quantum cryptographic communication (communication using quantum cryptography). In the quantum cryptographic communication, key data (common key) used for encryption and decryption of communication data is shared between a communication device on a side transmitting the communication data (hereinafter, referred to as a transmission-side encrypted communication device) and a communication device on a side receiving the communication data (hereinafter, referred to as a reception-side encrypted communication device). The sharing of the key data is realized by quantum key distribution (QKD).

Hereinafter, an outline of a communication system that performs quantum cryptographic communication by sharing key data by quantum key distribution is described with reference to FIG. 1.

As illustrated in FIG. 1, a communication system 1 includes a transmission-side QKD device 10a, a reception-side QKD device 10b, a transmission-side encrypted communication device 20a, and a reception-side encrypted communication device 20b.

The transmission-side QKD device 10a and the reception-side QKD device 10b operate to share key data by quantum key distribution via a quantum communication path 2 and a classical communication path 3.

The transmission-side QKD device 10a includes a key generation unit 11a, a key transmission unit 12a, a communication unit 13a, a key distillation unit 14a, and a key providing unit 15a.

The key generation unit 11a generates key data from a random number. The key data used in the present embodiment is, for example, a common key defined in a common key encryption method.

The key transmission unit 12a continuously transmits the key data generated by the key generation unit 11a to the reception-side QKD device 10b with a single photon via the quantum communication path 2 (optical fiber).

The communication unit 13a performs communication with the reception-side QKD device 10b for key distillation via the classical communication path 3 (for example, a network such as Ethernet (registered trademark)).

The key distillation unit 14a performs key distillation to exclude a bit string having likelihood of eavesdropping from the key data transmitted via the quantum communication path 2 based on the communication (for example, exchange of control data) with the reception-side QKD device 10b performed by the communication unit 13a.

The key providing unit 15a provides (transmits) the key data obtained by performing the key distillation by the key distillation unit 14a to the transmission-side encrypted communication device 20a via a local area network (LAN), an internal bus, or the like.

The reception-side QKD device 10b includes a key receiving unit 11b, a communication unit 12b, a key distillation unit 13b, and a key providing unit 14b.

The key receiving unit 11b receives the key data (single photon) transmitted from the transmission-side QKD device 10a via the quantum communication path 2.

The communication unit 12b performs communication with the transmission-side QKD device 10a for key distillation via the classical communication path 3.

The key distillation unit 13b performs key distillation to exclude a bit string having likelihood of eavesdropping from the key data received via the quantum communication path 2 based on the communication with the transmission-side QKD device 10a performed by the communication unit 12b.

The key providing unit 14b provides (transmits) the key data obtained by performing the key distillation by the key distillation unit 13b to the reception-side encrypted communication device 20b via a LAN, an internal bus, or the like.

With the transmission-side QKD device 10a and the reception-side QKD device 10b described above, the same key data (common key) can be securely obtained in the transmission-side encrypted communication device 20a and the reception-side encrypted communication device 20b.

Note that security of communication between the transmission-side QKD device 10a and the transmission-side encrypted communication device 20a and communication between the reception-side QKD device 10b and the reception-side encrypted communication device 20b are guaranteed (that is, there is no likelihood that the key data provided from the transmission-side QKD device 10a to the transmission-side encrypted communication device 20a and the key data provided from the reception-side QKD device 10b to the reception-side encrypted communication device 20b are eavesdropped or the like).

The transmission-side encrypted communication device 20a includes a communication application unit 21a, an encryption processing unit 22a, and a communication unit 23a. The communication application unit 21a outputs communication data. The encryption processing unit 22a encrypts the communication data output from the communication application unit 21a by using the key data provided from the transmission-side QKD device 10a. Note that the encryption processing unit 22a acquires, for example, encrypted data obtained by exclusive OR of communication data and key data. The communication unit 23a transmits the encrypted data acquired by the encryption processing unit 22a to the reception-side encrypted communication device 20b via a classical communication path 4.

The reception-side encrypted communication device 20b includes a communication unit 21b, a decryption processing unit 22b, and a communication application unit 23b. The communication unit 21b receives the encrypted data transmitted from the transmission-side encrypted communication device 20a. The decryption processing unit 22b decrypts the encrypted data received by the communication unit 21b by using the key data provided from the reception-side QKD device 10b. Note that the decryption processing unit 22b acquires, for example, decrypted data obtained by exclusive OR of encrypted data and key data. The communication application unit 23b performs a process using the decrypted data (that is, the communication data) acquired by the decryption processing unit 22b.

With the communication system 1 described above, the transmission-side encrypted communication device 20a and the reception-side encrypted communication device 20b can perform communication by common key encryption using the common key data provided from the transmission-side QKD device 10a and the reception-side QKD device 10b. Specifically, in the communication system 1, communication capable of preventing eavesdropping by a third party can be realized by encrypting and decrypting the communication data by using the key data shared by quantum key distribution.

Note that, for example, a one time pad (OTP) is used as the encryption communication method used in the communication system 1 described above. The one time pad is a method of performing encryption and decryption by using key data having the same length (size) as that of the communication data and not reusing the key data used once. According to this, it is possible to improve the security of transmission and reception of communication data using the classical communication path 4.

Hereinafter, the encrypted communication device according to the present embodiment is described in detail. FIG. 2 is a diagram illustrating an example of a hardware configuration of the encrypted communication device. As illustrated in FIG. 2, an encrypted communication device 20 includes a central processing unit (CPU) 101, a main memory (main memory device, primary storage) 102, a storage (auxiliary storage device, secondary storage) 103, and a network interface (communication control device) 104. Note that, in the present embodiment, the encrypted communication device 20 may be any of the transmission-side encrypted communication device 20a and the reception-side encrypted communication device 20b described above.

The CPU 101 and the main memory 102 are connected by a memory bus 105. The CPU 101, the storage 103, and the network interface 104 are connected by an expansion bus 106. The expansion bus 106 includes a bus (PCIe bus) that connects the CPU 101 and peripheral devices and conforms to, for example, peripheral component interconnect express (PCIe) standard. Although it is assumed in FIG. 2 that the memory bus 105 and the expansion bus 106 are different buses, the main memory 102 may be connected to the CPU 101 by the expansion bus 106. The memory bus 105 and the expansion bus 106 may be collectively referred to as an internal bus.

The CPU 101 incorporates a memory controller (not illustrated) and executes a program loaded on the main memory 102 while reading the program. The main memory 102 includes, for example, a dynamic random access memory (DRAM).

In addition, the CPU 101 controls the storage 103 and the network interface 104 via the expansion bus 106. Specifically, the CPU 101 writes and reads data to and from the storage 103. The CPU 101 also transmits and receives communication data (for example, a frame) using the network interface 104.

In the present embodiment, the CPU 101 and the main memory 102 are referred to as a host (host computer) for convenience.

The storage 103 includes, for example, a solid state drive (SSD). In addition, the network interface 104 is configured with a field programmable gate array (FPGA) or an application specific integrated circuit (ASIC), for example, so as to transmit and receive Ethernet frames.

Although not illustrated in FIG. 2, the encrypted communication device 20 may further include a DRAM or a static random access memory (SRAM) for storing data in the network interface 104.

Note that a data constituent unit (protocol data unit (PDU)) in communication between the encrypted communication devices 20 (between the transmission-side encrypted communication device 20a and the reception-side encrypted communication device 20b) is referred to as a frame (layer 2), a packet (layers 3 and 4), a segment (TCP of layer 4 or the like), or a datagram (UDP of layer 4 or the like) depending on a communication layer or a communication protocol. In the present embodiment, it is mainly described that a data constituent unit is a frame.

Figure 3:
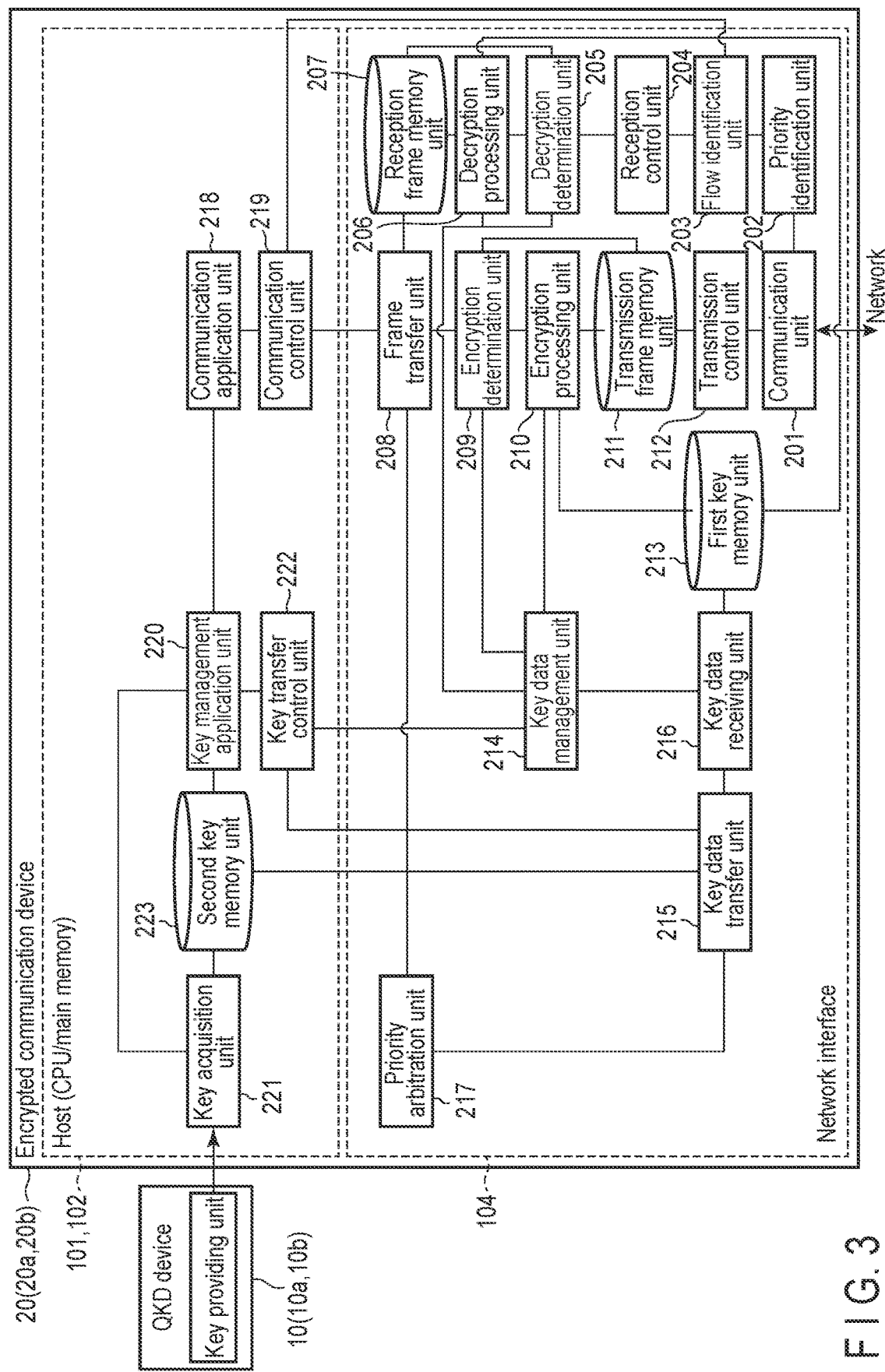
FIG. 3 is a block diagram illustrating an example of a functional configuration of the encrypted communication device.

FIG. 3 is a block diagram illustrating an example of a functional configuration of the encrypted communication device 20. As illustrated in FIG. 3, the encrypted communication device 20 includes a communication unit 201, a priority identification unit 202, a flow identification unit 203, a reception control unit 204, a decryption determination unit 205 (first decryption determination unit), a decryption processing unit 206 (first decryption processing unit), a reception frame memory unit 207, a frame transfer unit 208, an encryption determination unit 209 (first encryption determination unit), an encryption processing unit 210 (first encryption processing unit), a transmission frame memory unit 211, a transmission control unit 212, a first key memory unit 213, a key data management unit 214, a key data transfer unit 215, a key data receiving unit 216, and a priority arbitration unit 217. The encrypted communication device 20 further includes a communication application unit 218, a communication control unit 219, a key management application unit 220, a key acquisition unit 221, a key transfer control unit 222, and a second key memory unit 223.

Some or all of the above-described units 201 to 223 may be realized by a computer of the encrypted communication device 20 executing a predetermined program (that is, software), may be realized by hardware, or may be realized by a combination of software and hardware.

In the present embodiment, the respective units 201 to 217 are functional units realized by the network interface 104 connected to the host (the CPU 101 and the main memory 102) via the internal bus. Each unit 218 to 223 is a functional unit realized by the host. Some of the units 218 to 223 may be realized by the CPU 101 alone or may be realized by the main memory 102 alone.

Furthermore, the encrypted communication device 20 illustrated in FIG. 3 is connected to the QKD device 10 (the transmission-side QKD device 10a or the reception-side QKD device 10b), is configured to be able to operate as the transmission-side encrypted communication device 20a illustrated in FIG. 1, and operate as the reception-side encrypted communication device 20b. In other words, the encrypted communication device 20 includes a functional unit for realizing the function of the transmission-side encrypted communication device 20a and a functional unit for realizing the function of the reception-side encrypted communication device 20b. For example, the respective units 201 to 208 realized by the network interface 104 correspond to functions of the reception-side encrypted communication device 20b (that is, a reception-side network interface). Also, the respective units 201 and 208 to 212 realized by the network interface 104 correspond to functions of the transmission-side encrypted communication device 20a (that is, a transmission-side network interface).

Note that the communication application unit 21a included in the transmission-side encrypted communication device 20a and the communication application unit 23b included in the reception-side encrypted communication device 20b illustrated in FIG. 1 correspond to the communication application unit 218 illustrated in FIG. 3. Furthermore, the encryption processing unit 22a included in the transmission-side encrypted communication device 20a illustrated in FIG. 1 corresponds to the encryption processing unit 210 illustrated in FIG. 3. Furthermore, the decryption processing unit 22b included in the reception-side encrypted communication device 20b illustrated in FIG. 1 corresponds to the decryption processing unit 206 illustrated in FIG. 3. Furthermore, the communication unit 23a included in the transmission-side encrypted communication device 20a and the communication unit 21b included in the reception-side encrypted communication device 20*b* illustrated in FIG. 1 correspond to the communication unit 201 illustrated in FIG. 3.

Hereinafter, an outline of the respective units 201 to 223 included in the encrypted communication device 20 described above is described. In the following description, a frame transmitted from the transmission-side encrypted communication device 20*a* to the reception-side encrypted communication device 20*b* when the encrypted communication device 20 operates as the transmission-side encrypted communication device 20*a* is referred to as a transmission frame, and a frame transmitted from the transmission-side encrypted communication device 20*a* to the reception-side encrypted communication device 20*b* (that is, a frame received by the reception-side encrypted communication device 20*b*) when the encrypted communication device 20 operates as the reception-side encrypted communication device 20*b* is referred to as a reception frame.

The communication unit 201 transmits and receives frames via the network (classical communication path 4). The communication unit 201 performs a process for performing communication by a protocol such as Ethernet. Specifically, the communication unit 201 performs a process of a data link layer and a physical layer in an OSI reference model and realizes functions referred to as a media access controller (MAC) and a PHY. Note that the plurality of communication units 201 may be provided in the network interface 104. In the present embodiment, the communication unit 201 corresponds to an acquisition unit that acquires data (reception frame) transmitted from another encrypted communication device 20 (second communication device) to the encrypted communication device 20 (first communication device).

The priority identification unit 202 determines the priority of the reception frame. The priority determined by the priority identification unit 202 is set as attached information of the reception frame.

The flow identification unit 203 identifies the flow to which the corresponding reception frame belongs, by using a flow identifier (flow identification information) and (data of) the reception frame described below.

The reception control unit 204 performs a reception process according to the time-sensitive networking (TSN) standard defined in IEEE 802.1. The reception control unit 204 performs, for example, a process of performing input restriction of a specific flow or a process of removing duplication in a case where frames replicated in order to improve stability in transmission and reception of frames are received in a duplicate manner.

The decryption determination unit 205 determines whether the reception frame is a target of a decryption process based on (the information of) the flow identifier and the encryption method corresponding to the corresponding flow identifier.

The decryption processing unit 206 reads key data from the first key memory unit 213 described below and decrypts the reception frame by using the corresponding key data. The decryption processing unit 206 can obtain the decrypted reception frame (plain text data) by performing the decryption process on the reception frame (encrypted data) according to the encryption method corresponding to the flow identifier.

The reception frame memory unit 207 stores the reception frame. Note that the reception frame memory unit 207 includes a queue (FIFO: First In First Out) prepared for each priority.

The frame transfer unit 208 transfers data (plain text data described below) of a frame (reception frame and a transmission frame) between (main memory 102 of) the host and the network interface 104 by direct memory access (DMA) without a process of the CPU 101. Note that the transfer of the frame by the frame transfer unit 208 is controlled based on the priority of the corresponding frame (the priority allocated to the flow to which the corresponding frame belongs). In the present embodiment, the frame transfer unit 208 corresponds to an acquisition unit that acquires data (transmission frame) transmitted from the encrypted communication device 20 (first communication device) to another encrypted communication device 20 (second communication device) via a network.

The encryption determination unit 209 determines whether the transmission frame is a target of the encryption process based on (the information of) the flow identifier and the encryption method corresponding to the corresponding flow identifier.

The encryption processing unit 210 reads the key data from the first key memory unit 213 and encrypts the transmission frame by using the corresponding key data. The encryption processing unit 210 can obtain the encrypted transmission frame (encrypted data) by performing the encryption process on the transmission frame (plain text data) according to the encryption method corresponding to the flow identifier.

The transmission frame memory unit 211 stores the transmission frame. Note that the transmission frame memory unit 211 includes a queue (FIFO) prepared for each priority.

The transmission control unit 212 controls the transmission order of the transmission frames by performing a transmission process according to the TSN standard described above. Specifically, the transmission control unit 212 performs a process such as enhancements for scheduled traffic (EST) for controlling transmission of a frame by opening and closing a gate based on the priority, Frame Preemption for interrupting transmission of a low priority frame and transmitting a high priority frame, or Frame Replication for replicating and transmitting a frame.

The first key memory unit 213 stores the key data transferred from the host for each flow. The key data stored in the first key memory unit 213 is provided to the decryption processing unit 206 in response to a decryption request and is provided to the encryption processing unit 210 in response to an encryption request. Note that the key data stored in the first key memory unit 213 is sequentially read according to the length of the frame (data) to be decrypted and encrypted and used for the decryption process and the encryption process.

The key data management unit 214 manages the key data stored in the first key memory unit 213. In addition, the key data management unit 214 requests the key transfer control unit 222 to transfer the key data for each flow based on the data amount of the key data stored in the first key memory unit 213 for each flow.

The key data transfer unit 215 performs a process of transferring the key data from the host (second key memory unit 223) to the network interface 104 (first key memory unit 213).

The key data receiving unit 216 receives the key data via the key data transfer unit 215 and writes the key data in the first key memory unit 213.

The priority arbitration unit 217 arbitrates the transfer of the frame by the frame transfer unit 208 and the transfer of the key data by the key data transfer unit 215 based on the priority.

The communication application unit 218 is realized by an application (program) operating on the encrypted communication device 20 and transmits and receives communication data via the communication control unit 219. When the encrypted communication device 20 operates as the transmission-side encrypted communication device 20a, the communication application unit 218 operates to generate communication data to be transmitted to another encrypted communication device 20 (that is, the reception-side encrypted communication device 20b). In a case where the encrypted communication device 20 operates as the reception-side encrypted communication device 20b, the communication application unit 218 operates to perform a process on the communication data received from another encrypted communication device 20 (that is, the transmission-side encrypted communication device 20a) (that is, to consume the communication data). In addition, the communication application unit 218 sets key data and a flow identifier (information for identifying a flow) used for communication (encryption and decryption of a frame) via the communication control unit 219 and the key management application unit 220. Note that the plurality of communication application units 218 may exist according to an application operating on the encrypted communication device 20.

The communication control unit 219 controls communication using the network interface 104 in accordance with an instruction from the communication application unit 218. The communication control unit 219 is realized by a protocol stack for performing communication and a function of a driver of the network interface 104.

The key management application unit 220 manages key data used for communication in accordance with an instruction from the communication application unit 218. Specifically, the key management application unit 220 instructs the key acquisition unit 221 to acquire key data and store the key data in the second key memory unit 223. Further, the key management application unit 220 instructs the key transfer control unit 222 to transfer the key data.

The key acquisition unit 221 acquires key data, for example, from the QKD device 10 (key providing unit) in accordance with the instruction from the key management application unit 220. In addition, the key acquisition unit 221 writes (stores) the acquired key data in the second key memory unit 223.

The key transfer control unit 222 performs control for transferring the key data stored in the second key memory unit 223 to the network interface 104 in accordance with the instruction from the key management application unit 220.

The second key memory unit 223 is configured to store key data. The second key memory unit 223 is realized by the main memory 102. That is, the area of the second key memory unit 223 is secured in the main memory 102.

Next, the operation of the encrypted communication device 20 according to the present embodiment is described. The encrypted communication device 20 according to the present embodiment has a mechanism for smoothly transferring key data provided from the QKD device 10 from the host (the CPU 101 and the main memory 102) side to the network interface 104 side in advance in order to realize low-delay communication, for example, in a case where an encryption communication method of sequentially switching key data such as a one time pad is used in quantum cryptographic communication.

In the present embodiment, in order to realize the smooth transfer of the key data described above, a setting process for operating as the transmission-side encrypted communication device 20a (hereinafter, referred to as transmission-side setting process), a setting process for operating as the reception-side encrypted communication device 20b (hereinafter, referred to as a reception-side setting process), a process for transferring the key data provided from the QKD device 10 (key providing unit) from the host to the network interface 104 (hereinafter referred to as a key data transfer process), a process for operating as the transmission-side encrypted communication device 20a to transmit a frame (hereinafter, referred to as a frame transmission process), and a process for operating as the reception-side encrypted communication device 20b to receive the frame (hereinafter, referred to as a frame reception process) are performed. Each of these processes is described below.

Figure 4:
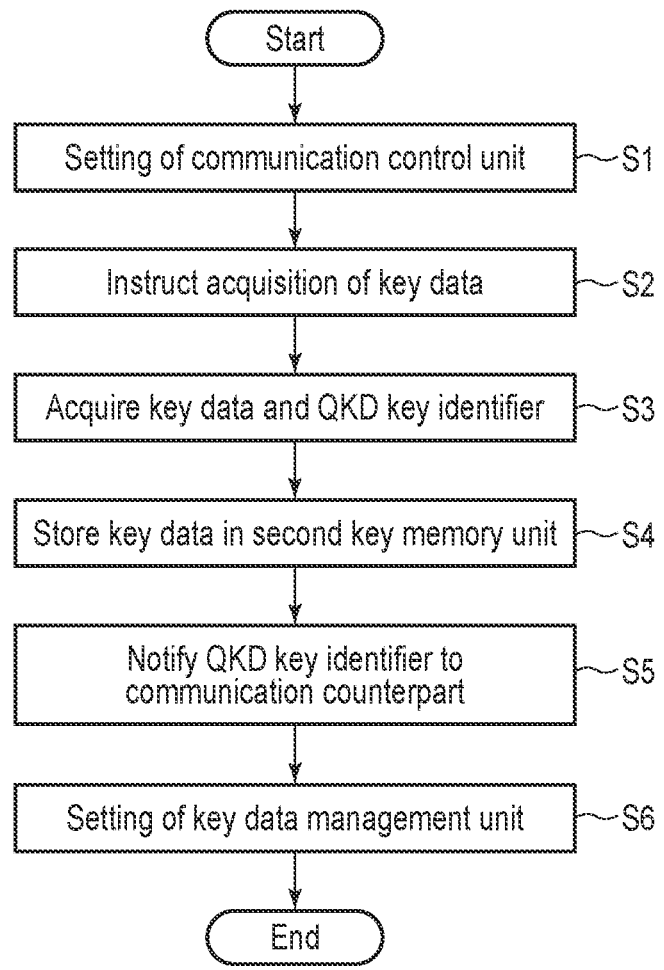
FIG. 4 is a flowchart illustrating an example of a processing procedure of a transmission-side setting process.

An example of a processing procedure of the above-described transmission-side setting process is described with reference to the flowchart of FIG. 4. The encrypted communication device 20 in the description of FIG. 4 is intended as the transmission-side encrypted communication device 20a, and the other encrypted communication device 20 is intended as the reception-side encrypted communication device 20b.

First, the communication application unit 218 included in the encrypted communication device 20 is realized by an operation of an application that starts communication with another encrypted communication device 20 on the corresponding encrypted communication device 20 and operates to generate communication data to be transmitted to the other encrypted communication device 20. The communication application unit 218 sets the communication control unit 219 in order to transmit the communication data generated in this manner to another encrypted communication device 20 (step S1).

In step S1, a priority of the communication data generated by the communication application unit 218 (that is, the communication performed by the communication application unit 218) and an identifier for identifying a flow to which (a frame for transmitting) the corresponding communication data belongs (flow identifier) are set. Note that a flow corresponds to a series of flows of communication, and frames having common attributes such as a MAC address, a VLAN ID, an IP address, a port number, and a protocol number are treated as frames belonging to the same flow. It can be said that the flow identifier is information for identifying an application or a flow of communication used in the application.

Next, the communication application unit 218 instructs the key management application unit 220 to acquire key data (step S2).

Here, the key data is acquired by using, for example, a key acquisition interface as defined in ETSI GS QKD004. In this case, the key management application unit 220 designates the identifier (SAE ID) of the counterpart application with which the corresponding communication is to be performed in the application that starts the communication, thereby acquiring the key data and the QKD key identifier for identifying the key data (step S3). Note that the key data and the QKD key identifier are acquired via the key acquisition unit 221.

The key data acquired in step S3 is stored in the second key memory unit 223 (step S4). The key data stored in the second key memory unit 223 in step S4 is managed for each flow by the key management application unit 220.

Here, FIG. 5 illustrates an example of a data structure of data for managing the key data stored in the second key memory unit 223 (hereinafter, referred to as first key management data).

As illustrated in FIG. 5, for example, a priority, a QKD key index, a QKD key identifier, an address, a length, and a transferred data size in association with the above-described flow identifier are stored in the first key management data.

The priority corresponds to the priority set in step S1 described above. The QKD key index corresponds to management information such as numbers assigned to sequentially use key data. The QKD key identifier is information for identifying key data as described above and is, for example, a KeyID in ETSI GS QKD 004. The address indicates the position (address) of the key data stored in the second key memory unit 223. The length indicates the length (data size) of the key data stored in the second key memory unit 223. The transferred data size indicates the size (position, offset) of key data that has already been instructed to be transferred from the CPU 101 and the main memory 102 to the network interface 104 among the key data stored in the second key memory unit 223.

Referring back to FIG. 4, the other encrypted communication device 20 (that is, the encrypted communication device 20 of the communication counterpart) is notified of the QKD key identifier acquired in step S3 (step S5).

Next, the key management application unit 220 sets the key data management unit 214 via the key transfer control unit 222 (step S6). In step S6, for example, data for managing the decryption processing unit 206, the encryption processing unit 210, and the first key memory unit 213 (hereinafter, referred to as second key management data) is set.

FIG. 6 illustrates an example of a data structure of the second key management data. As illustrated in FIG. 6, in the second key management data, for example, an encryption method, a write position, a read position, the number of circulations, and a buffer size are set in association with the above-described flow identifier.

Figure 7:
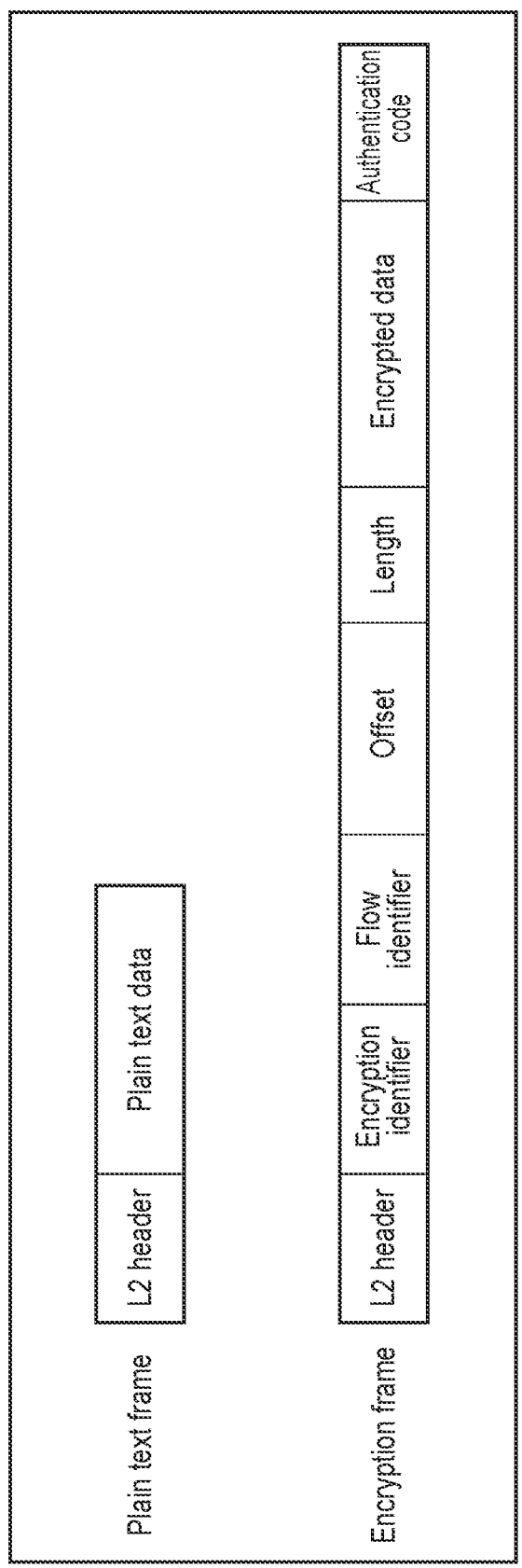
FIG. 7 is a diagram illustrating an example of a format of a frame.

As the encryption method, for example, an L2 encryption/OTP method can be designated. The L2 encryption/OTP method indicates that the L2 encryption is performed by the OTP method. Here, FIG. 7 illustrates an example of a frame format in the layer 2 described above. FIG. 7 illustrates a plain text frame including plain text data and a frame subjected to L2 encryption as encryption in the layer 2 (encryption frame). Note that, in the L2 encryption, headers of layer 3 and higher layers are simply treated as plain text data. As illustrated in FIG. 7, in a case where the plain text frame is encrypted, encryption information (encryption header) is added to the encryption frame together with encrypted data obtained by encrypting the plain text data.

The encryption information includes, for example, an encryption identifier, a flow identifier, an offset, a length, and an authentication code.

The encryption identifier includes encryption presence/absence information indicating whether the frame is encrypted, and encryption method information indicating an encryption method applied to the frame when the frame is encrypted.

The flow identifier is, for example, information for identifying an application that performs communication or a flow of communication used in the corresponding application (a flow to which a frame belongs).

The offset includes position information indicating the position of the frame counted from the head in the communication flow. This position information may be, for example, the number of bytes from the start of communication. Note that, in a case where the number of bits allocated to the position information is restricted, circulation may be performed. In addition, depending on the encryption method, the position information may not be the number of bytes but may be the number of transmission frames (packets).

The length indicates the length of the encrypted data or the length of the entire frame. The length is optional and does not necessarily have to be included in the encryption information.

The authentication code is used to detect whether the frame has not been falsified in the middle. The authentication code is generated (calculated) by using the information included in the frame and the key data. The authentication code is optional and does not necessarily have to be included in the encryption information.

Figure 8:
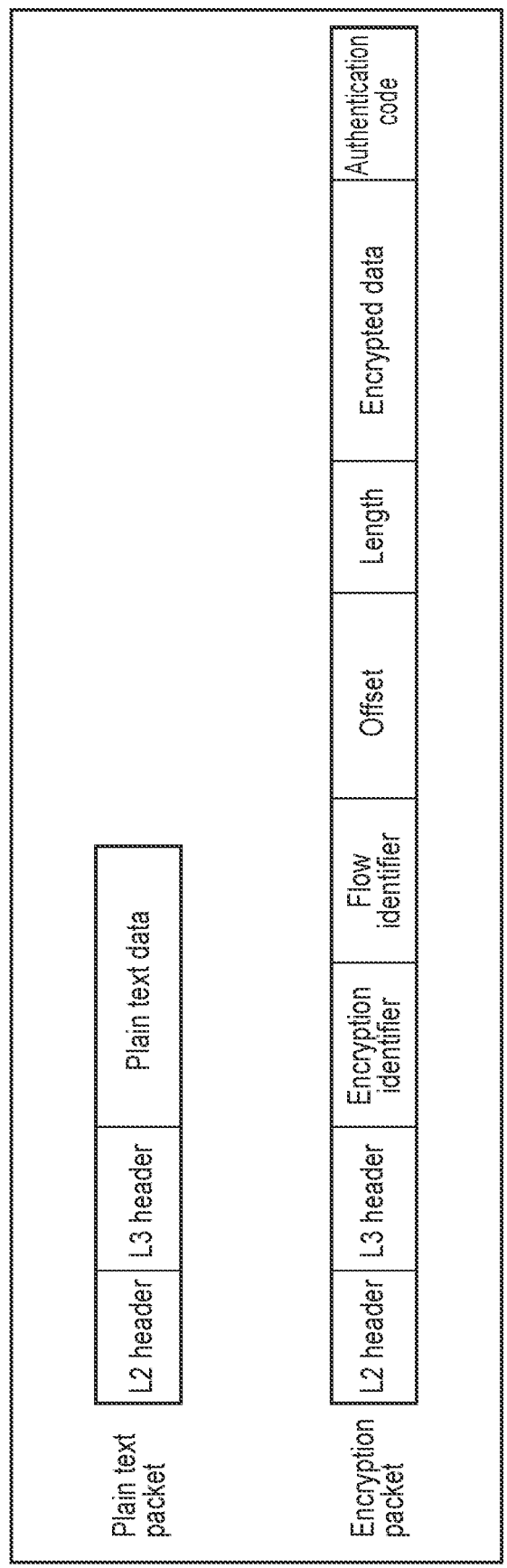
FIG. 8 is a diagram illustrating an example of a packet format.

Although the L2 encryption method is described here, for example, L3 encryption may be designated as the above-described encryption method. FIG. 8 illustrates an example of a packet format in the layer 3. FIG. 8 illustrates a plain text packet including plain text data and a packet (encryption packet) subjected to L3 encryption as encryption in the layer 3. Note that, in the L3 encryption, headers of the layer 4 and higher layers are simply treated as plain text data. As illustrated in FIG. 8, in a case where the plain text packet is encrypted, encryption information is added to the encryption packet together with encrypted data obtained by encrypting the plain text data.

Further, as the encryption method, a method such as MACsec and IPsec may be designated. When the encryption method is MACsec, the fact that Ethertype of MACsec is 0x88e5 and the E bits of the TCI field can be used as the encryption identifier. In addition, a value of an SCI field, a value of an AN field, or a combination thereof can be used as the flow identifier. Although there is no field directly corresponding to the offset, for example, the offset may be represented by a PN field. Furthermore, although an SL field is a field used in a case of less than 48 bytes, the corresponding SL field may be extended to indicate the length in the corresponding SL field. The authentication code may be represented by an ICV field. Note that a field that does not exist in MACsec may be newly provided.

In addition, in a case where the IPsec encapsulating security payload (ESP) is used as the encryption method, the fact that the protocol number of the IP header is 50 can be used as the encryption identifier. Further, a security parameter index (SPI) can be used as the flow identifier. The offset can be represented by using Sequence Number. Further, the offset may be represented by using the Extended Sequence Number option.

Furthermore, TLS may be designated as the encryption method. In this case, for example, the transmission control unit 212 and the reception control unit 204 may perform a process of the communication protocols up to the layer 4 and may perform an encryption process or a decryption process on the communication data obtained by the corresponding process.

Referring back to FIG. 6, the write position and the read position indicate a position where writing of key data is newly started in the first key memory unit 213 and a position where key data to be used for the next encryption process is read. That is, the write position corresponds to a head position where writing is performed next, and the read position corresponds to a head position where reading is performed next.

Figure 9:
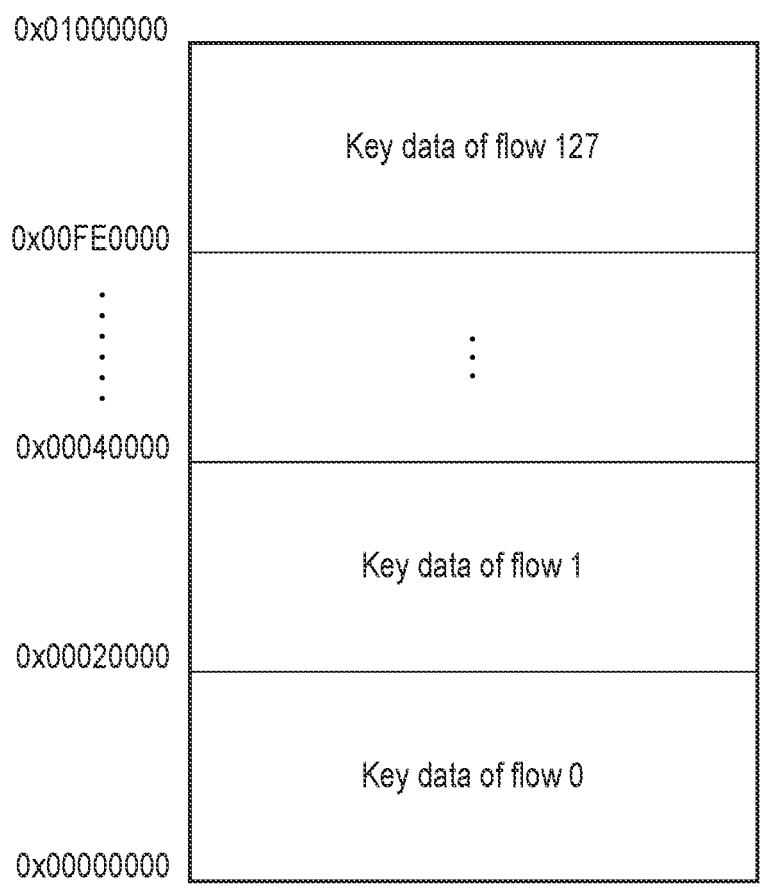
FIG. 9 is a diagram illustrating a buffer area included in a first key memory unit.

As illustrated in FIG. 9, the first key memory unit 213 has a fixed buffer area for each flow, and the corresponding buffer area is used as a ring buffer. Therefore, the write position and the read position are used for management of the first key memory unit 213.

Figure 10:
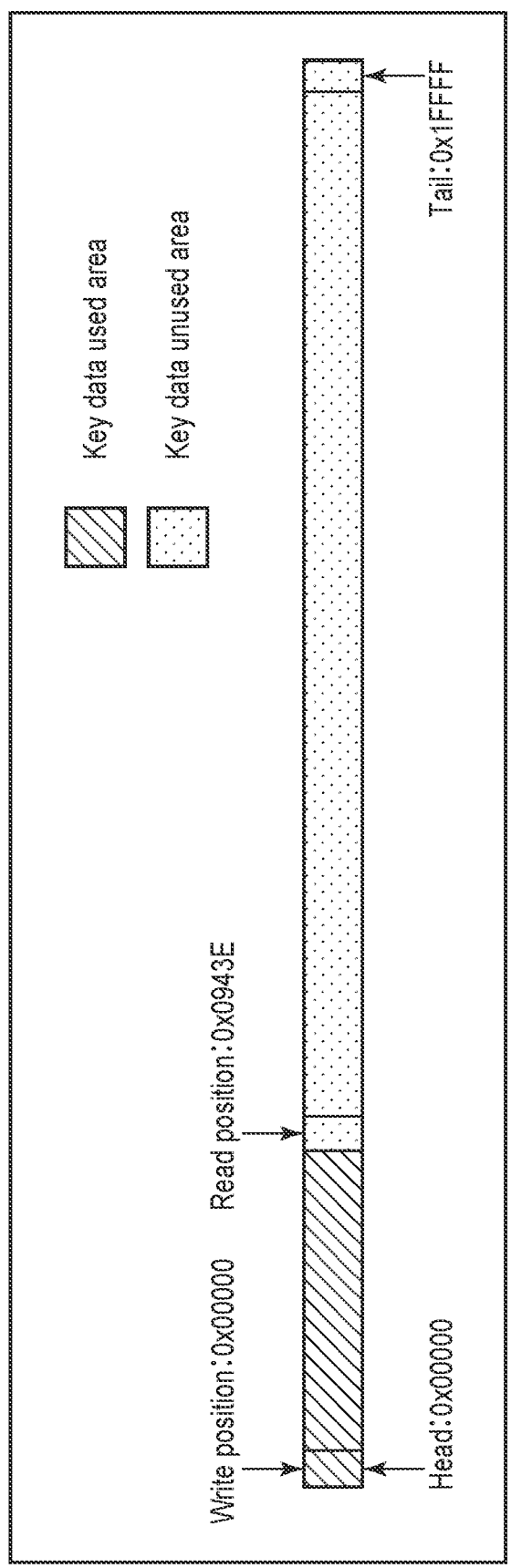
FIG. 10 is a diagram illustrating a management example of a ring buffer.

FIG. 10 illustrates a management example of the ring buffer (first key memory unit 213) using the above-described write position and read position. In the example illustrated in FIG. 10, an area of 128 KiB (0x00000 to 0x1FFFF) is used by using the write position and the read position. Specifically, when the write position is 0x00000, and the read position is 0x0943E, 0x00000 to 0x0943D are areas of key data that has already been used (area in which key data has been used), and 0x0943E to 0x1FFFF are areas of key data that have not yet been used (area in which key data has not been used).

Referring back to FIG. 6, the number of circulations indicates the number of circulations of reading in the ring buffer described above. The buffer size indicates the size (length) of the ring buffer described above.

In a case where the transmission-side setting process described above is performed, initial setting of the key data management unit 214 (that is, the second key management data illustrated in FIG. 6) is performed. The values of the write position, the read position, and the number of circulations included in the second key management data illustrated in FIG. 6 are updated by performing the key data transfer process and the frame transmission process described below.

Figure 11:
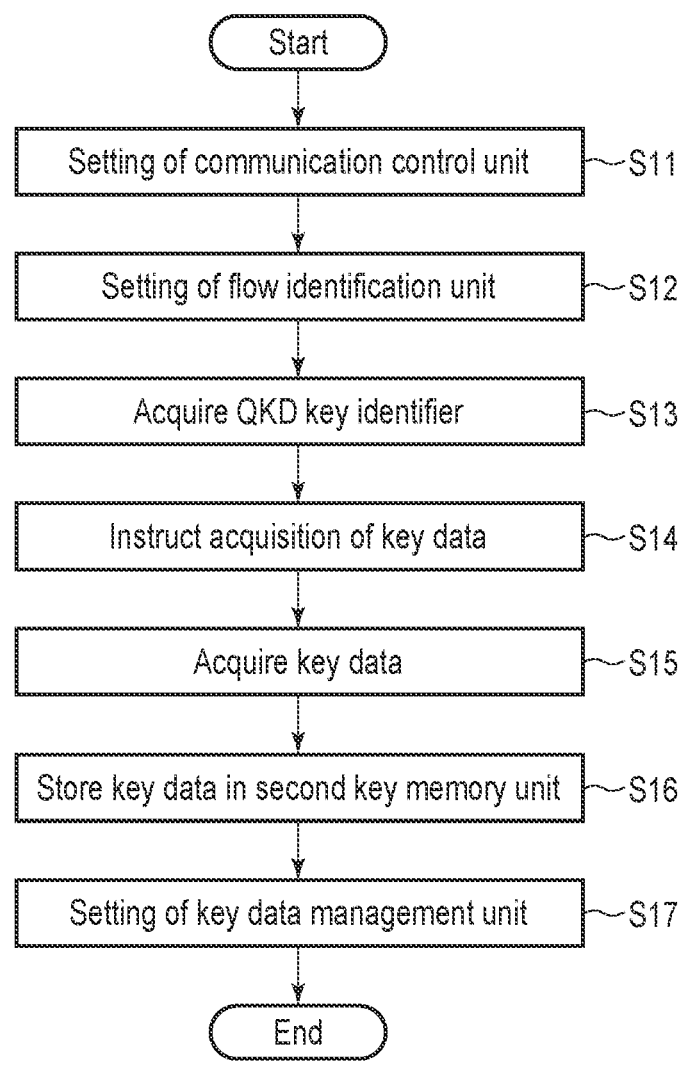
FIG. 11 is a flowchart illustrating an example of a processing procedure of a reception-side setting process.

Next, an example of a processing procedure of the above-described reception-side setting process is described with reference to the flowchart of FIG. 11. The encrypted communication device 20 in the description of FIG. 11 is intended as the reception-side encrypted communication device 20b, and the other encrypted communication device 20 is intended as the transmission-side encrypted communication device 20a.

First, the communication application unit 218 included in the encrypted communication device 20 is realized by an operation of an application that starts communication with another encrypted communication device 20 on the encrypted communication device 20 and operates to receive communication data transmitted from the other encrypted communication device 20 and perform a process on the corresponding communication data. The communication application unit 218 sets the communication control unit 219 in order to receive the communication data transmitted from the other encrypted communication device 20 (step S11).

In step S11, a flow to which a frame transmitted from the other encrypted communication device 20 belongs (that is, the flow of communication performed by the communication application unit 218) is set.

Next, the communication application unit 218 sets the flow identification unit 203 (step S12). In step S12, flow identification setting information related to the identification of the flow in the flow identification unit 203 is transmitted to the communication control unit 219, and the flow identification unit 203 is set based on the corresponding flow identification setting information.

Here, FIG. 12 illustrates a setting example of the flow identification unit 203. As illustrated in FIG. 12, when stream identification (flow identification) of IEEE 802.1CB is used, a flow is defined by using a MAC address, a virtual local area network (VLAN) ID, or the like.

In the example illustrated in FIG. 12, for example, in a case where a destination MAC address is "AA-BB-CC-DD-EE-01", and the VLAN ID is "10", (a flow of) the flow identifier is identified as "0". Also, for example, in a case where a transmission source MAC address is "AA-BB-CC-DD-EE-02", and the VLAN ID is "20", (a flow of) the flow identifier is identified as "1".

Note that the flow may be identified from the header information of MACsec or IPsec described above.

Here, the process of step S5 of the transmission-side setting process illustrated in FIG. 4 is performed, so that the encrypted communication device 20 (the reception-side encrypted communication device 20b) is notified of the QKD key identifier from the other encrypted communication device 20 (the transmission-side encrypted communication device 20a). Referring back to FIG. 11, the communication application unit 218 acquires the QKD key identifier notified from the other encrypted communication device 20 (step S13).

Next, the communication application unit 218 instructs the key management application unit 220 to acquire key data (step S14).

When the process in step S14 is performed, the key management application unit 220 acquires the key data via the key acquisition unit 221 (step S15). Note that since the process of acquiring the key data is similar to the process described in the transmission-side setting process described above, a detailed description thereof is omitted here.

When the process of step S15 is performed, the processes of steps S16 and S17 similar to the processes of steps S4 and S5 illustrated in FIG. 4 are performed.

In a case where the reception-side setting process described above is performed, initial setting of the key data management unit 214 (that is, the second key management data illustrated in FIG. 6) is performed similarly to the transmission-side setting process.

Next, an example of a processing procedure of the above-described key data transfer process is described with reference to the flowchart of FIG. 13. Note that the key data transfer process is also performed by the encrypted communication device 20 operating as the transmission-side encrypted communication device 20a and is also performed by the encrypted communication device 20 operating as the reception-side encrypted communication device 20b.

Note that the transfer of the key data in the present embodiment is performed based on a key transfer request from the key data management unit 214 included in the network interface 104. Specifically, the transfer of the key data is started when the CPU 101 receives an interrupt from the key data management unit 214 via the internal bus. Note that an interrupt is described as an example here, but the transfer of the key data may be performed according to a polling operation by the CPU 101. In this case, the key data management unit 214 writes a value in a status field of a key transfer descriptor entry described below, and the host detects a change in the value to perform a polling operation.

First, the key management application unit 220 detects a key transfer request from the key data management unit 214 via the key transfer control unit 222. The key transfer request includes a flow identifier, and the key management application unit 220 specifies a flow for transferring the key data (that is, a flow that is a target of the key transfer request) based on the corresponding flow identifier (step S21). In the following description, the flow specified in step S21 is referred to as a target flow.

The key management application unit 220 determines whether there is sufficient key data of the target flow in the second key memory unit 223 (step S22).

Here, as described above, the key management application unit 220 manages the key data stored in the second key memory unit 223 by using the first key management data illustrated in FIG. 5 described above. In this case, in step S22, by referring to the length and the transferred data size included in the first key management data in association with the flow identifier of the target flow, it is determined whether sufficient key data for transfer from the host to the network interface 104 is stored in the second key memory unit 223.

When it is determined that there is not sufficient key data of the target flow in the second key memory unit 223 (NO in step S22), the key management application unit 220 instructs the key acquisition unit 221 to acquire key data (key data of the target flow), and the key data is acquired via the key acquisition unit 221 (step S23). The key data acquired in step S23 is stored in the second key memory unit 223 (step S24).

Meanwhile, when it is determined that there is sufficient key data of the target flow in the second key memory unit 223 (YES in step S22), the processes of steps S23 and S24 are not performed.

Next, the key management application unit 220 instructs the key data transfer unit 215 to transfer the key data via the key transfer control unit 222 (step S25).

When the process in step S25 is performed, the key data is transferred from the second key memory unit 223 (that is, main memory 102 of the host) to the first key memory unit 213 (That is, the network interface 104) according to the instruction from the key management application unit 220 (step S26).

Hereinafter, an outline of the transfer of the key data in the present embodiment is described with reference to FIG. 14. First, in the present embodiment, as illustrated in FIG. 14, a key transfer descriptor ring is stored in the system memory (main memory 102), and the key data transfer unit 215 is controlled by using the corresponding key transfer descriptor ring. The key transfer descriptor ring has eight descriptor rings corresponding to channels 0 to 7. Here, it is assumed that (the descriptor ring corresponding to) the channel 7 is used for transferring the key data with the highest priority, and (the descriptor ring corresponding to) the channel 0 is used for transferring the key data with the lowest priority. The descriptor ring corresponding to each channel has a form of a ring buffer and includes a plurality of descriptor entries.

Note that FIG. 15 illustrates an example of one descriptor entry in the key transfer descriptor ring illustrated in FIG. 14. As illustrated in FIG. 15, the descriptor entry includes a key data transfer source address, a key data length, a key data transfer destination address, and a status. The key data transfer source address indicates an address (position) of the key data stored in the second key memory unit 223. The key data length indicates a length of key data to be transferred from the key data transfer source address. The key data transfer destination address indicates a head address when the key data is written in the first key memory unit 213. The status includes information indicating whether the transfer of the key data has been normally completed, information indicating whether an error has occurred in the transfer of the key data, and the like.

As illustrated in FIG. 14, the key management application unit 220 refers to the first key management data and notifies the key transfer control unit 222 of the priority in association with the flow identifier of the target flow (the priority of the target flow) (step S201).

Next, the key transfer control unit 222 specifies a channel through which the key data is transferred based on the priority of the target flow notified from the key management application unit 220. In this case, the key transfer control unit 222 can use, for example, a channel allocated with the same number as the priority of the target flow notified from the key management application unit 220.

Further, the key transfer control unit 222 performs setting for the descriptor entry of the descriptor ring corresponding to the specified channel (step S202), and in this case, the key transfer control unit 222 sets (the fields of) the key data transfer source address, the key data length, and the key data transfer destination address after clearing (the fields of) the status. Note that the key data transfer source address is specified from, for example, the address and the transferred data size included in the first key management data in association with the flow identifier of the target flow. However, the flow identifier of the target flow may be set (designated) instead of the key data transfer source address. The key data length is, for example, a predetermined value. The key data transfer destination address is specified based on, for example, the second key management data illustrated in FIG. 6 and the buffer area of the target flow illustrated in FIG. 9. Specifically, the key data transfer destination address corresponds to an address obtained by adding the write position (the write position included in the second key management data) acquired from the key data management unit 214 to the head address of the area (buffer area) of the first key memory unit 213 in which the key data of the target flow is stored.

Next, the key transfer control unit 222 instructs the key data transfer unit 215 to perform the process of the descriptor ring, the descriptor entry of which has been set, by using the channel number (number allocated to the channel) and the descriptor number (number allocated to the descriptor entry) (step S203).

In this case, the key data transfer unit 215 refers to the setting content for the descriptor entry that configures the corresponding descriptor based on the instruction (the channel number or the descriptor number) of the key transfer control unit 222 and starts the transfer of the key data.

Specifically, the key data transfer unit 215 reads the key data stored in the second key memory unit 223 realized by the main memory 102 of the host, for example, by DMA without a process by the CPU 101 (step S204). Such reading of the key data is performed based on the key data transfer source address and the key data length set in the descriptor entry described above.

The key data read from the second key memory unit 223 in this manner is transferred to the key data receiving unit 216 (step S205).

Note that the transfer of the key data and the transfer of a frame described below are arbitrated by the priority arbitration unit 217. According to the arbitration by the priority arbitration unit 217, the transfer with a higher priority (that is, a higher channel number) by the frame transfer unit 208 and the key data transfer unit 215 is preferentially performed. In addition, in a case where the priorities are the same, the priority arbitration unit 217, for example, performs round-robin arbitration or preferentially transfers the key data. In this case, the frame transfer unit 208 and the key data transfer unit 215 each operate to transmit the channel number of the channel desired to be transferred to the priority arbitration unit 217 and perform the transfer permitted by the priority arbitration unit 217.

Next, the key data receiving unit 216 receives key data transferred from the key data transfer unit 215 and writes the key data in the first key memory unit 213 (step S206). In this case, the key data receiving unit 216 writes the key data to (the area of the first key memory unit 213 designated by) the key data transfer destination address set in the descriptor entry.

Referring back to FIG. 13, as a result of the process using the descriptor, information indicating whether the transfer of the key data has been normally completed or the like is written in (a field of) a status included in the descriptor entry, and the status is updated (step S27).

When the process of step S27 is performed, a transfer process completion notification indicating completion of the transfer of the key data (the process instructed by the descriptor) is notified to the key transfer control unit 222 by an interrupt (step S28). When the result of the process is confirmed with the status included in the corresponding descriptor entry, the used descriptor entry can be reused for subsequent transfer of the key data.

Meanwhile, the key data receiving unit 216 updates the write position of the second key management data managed by the key data management unit 214 (the write position included in the second key management data in association with the flow identifier of the target flow) (step S29). In step S29, the write position is updated by advancing the write position by the amount of the key data written in the first key memory unit 213.

Here, the key data management unit 214 determines whether the area to which the key data can be newly transferred (that is, a transferable amount of the key data) is, for example, 64 KiB or more based on the write position and the read position included in the second key management data in association with the flow identifier of the target flow (step S30).

When it is determined that the transferable amount of key data is 64 KiB or more (YES in step S30), the key data management unit 214 newly issues a key transfer request including the flow identifier of the target flow (step S31). In other words, the key data management unit 214 requests the transfer of the key data based on the data amount of the key data stored in the first key memory unit 213. In a case where the process of step S31 is performed, the process returns to step S21, and the process is repeated.

Meanwhile, when it is determined that the transferable amount of the key data is not 64 KiB or more (that is, is less than 64 KiB) (NO in step S30), the key data transfer process is ended.

Note that 64 KiB used in the determination process in step S30 is an example, and in step S30, it may be determined whether the transferable amount of the key data is a certain value or more.

When the key data transfer process described above is performed, the key data can be sequentially transferred from the main memory 102 of the host to the network interface 104 in response to a key transfer request from the network interface 104 side (the key data management unit 214 included in the network interface 104).

Note that, in the key transfer request in the present embodiment, key data longer than key data used for one encryption process or decryption process (encryption process or decryption process for one frame or communication transfer unit) performed on a frame is required. In other words, while the key data is sequentially read from the first key memory unit 213 every time the encryption process or the decryption process is performed in the present embodiment, it is preferable that the key data having such a length that the encryption process or the decryption process can be performed a plurality of times at one time is transferred in order to reduce the number of times of transfer of the key data.

Figure 16:
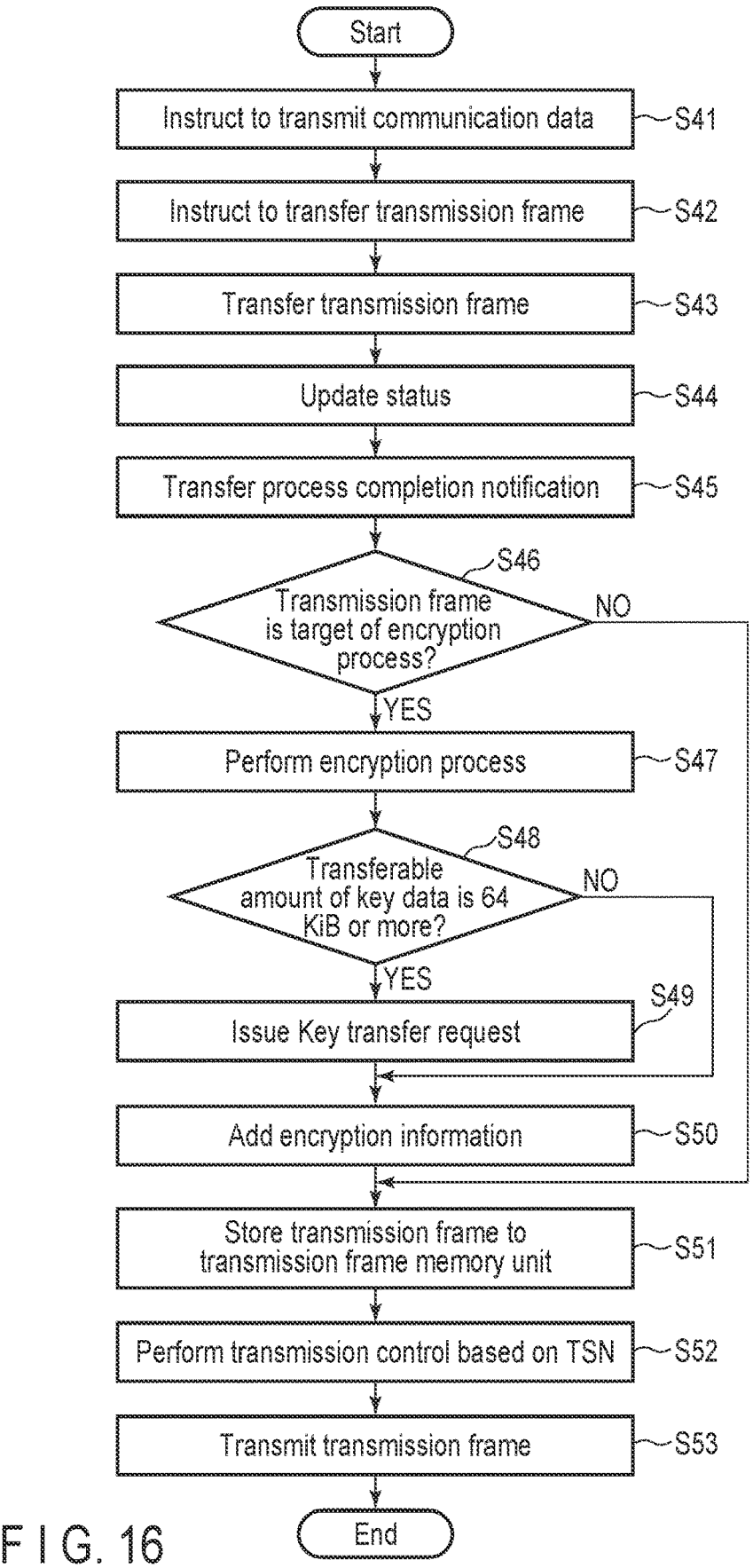
FIG. 16 is a flowchart illustrating an example of a processing procedure of a frame transmission process.

Next, an example of a processing procedure of the above-described frame transmission process is described with reference to the flowchart of FIG. 16. The encrypted communication device 20 in the description of FIG. 16 is intended as the transmission-side encrypted communication device 20a, and the other encrypted communication device 20 is intended as the reception-side encrypted communication device 20b.

First, the communication application unit 218 included in the encrypted communication device 20 generates communication data to be transmitted to the other encrypted communication device 20 and instructs the communication control unit 219 to transmit the corresponding communication data (step S41). The data of the frame for transmitting the communication data generated by the communication application unit 218 (hereinafter, referred to as a transmission frame) is stored in the system memory (the main memory 102).

Note that, in step S41, information indicating the priority of the corresponding communication (transmission frame) and information indicating the flow of the corresponding communication together with the communication data are notified by the communication application unit 218 to the communication control unit 219.

Next, the communication control unit 219 adds a header to the communication data as necessary and instructs the frame transfer unit 208 to transfer the transmission frame (step S42). When the process in step S42 is performed, the frame transfer unit 208 transfers the transmission frame in accordance with the instruction from the communication control unit 219 (step S43).

Hereinafter, an outline of transfer of a transmission frame is described with reference to FIG. 17. First, in the present embodiment, as illustrated in FIG. 17, a transmission frame descriptor ring is stored in the system memory (main memory 102), and a transmission frame transfer unit 208a in the frame transfer unit 208 is controlled by using the corresponding transmission frame descriptor ring. The transmission frame descriptor ring has eight descriptor rings corresponding to the channels 0 to 7. Here, it is assumed that (the descriptor ring corresponding to) the channel 7 is used for transferring the transmission frame with the highest priority, and (the descriptor ring corresponding to) the channel 0 is used for transferring the transmission frame with the lowest priority. The descriptor ring corresponding to each channel has a form of a ring buffer and includes a plurality of descriptor entries.

Figure 18:
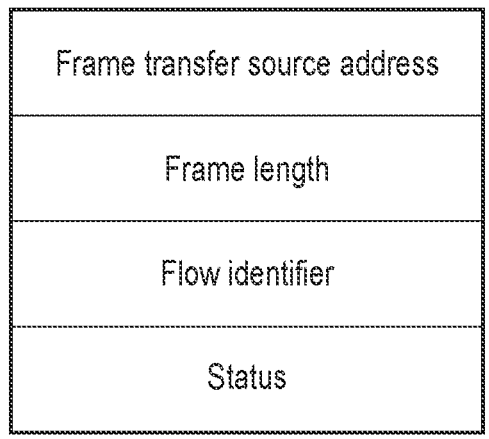
FIG. 18 is a diagram illustrating an example of a descriptor entry in a transmission frame descriptor ring.

Note that FIG. 18 illustrates an example of one descriptor entry in the transmission frame descriptor ring illustrated in FIG. 17. As illustrated in FIG. 18, the descriptor entry includes a frame transfer source address, a frame length, a flow identifier, and a status. The frame transfer source address indicates a head address (position) of the transmission frame stored in the system memory. The frame length indicates a length of a transmission frame to be transferred from a frame transfer source address. The flow identifier indicates a flow to which the transmission frame belongs. The status includes information indicating whether the transfer of the transmission frame has been normally completed, information indicating whether an error has occurred in the transfer of the transmission frame, or the like.

As illustrated in FIG. 17, the communication control unit 219 specifies a channel through which the transmission frame is transferred based on (information on) the priority of the transmission frame notified from the communication application unit 218. In this case, the communication control unit 219 can use, for example, a channel allocated with the same number as the priority of the transmission frame notified from the communication application unit 218.

Further, the communication control unit 219 performs setting for the descriptor entry of the descriptor ring corresponding to the specified channel (step S401). In this case, the communication control unit 219 sets (the fields of) the frame transfer source address, the frame length, and the flow identifier after clearing (the fields of) the status.

Next, the communication control unit 219 instructs the frame transfer unit 208 to perform a process of the descriptor ring, the descriptor entry of which has been set (frame transmission process) by using the channel number (number allocated to the channel) or the descriptor number (number allocated to the descriptor) (step S402).

In this case, the transmission frame transfer unit 208*a* refers to the setting content for the descriptor entry that configures the corresponding descriptor based on the instruction (the channel number or the descriptor number) of the communication control unit 219 and starts the transfer of the transmission frame.

Here, as described above, the transfer of the frame and the transfer of the key data are arbitrated by the priority arbitration unit 217. When the transfer of the transmission frame (transmission in the channel instructed to transfer) is permitted by the priority arbitration unit 217, the transmission frame transfer unit 208*a* reads the transmission frame stored in the system memory via the internal bus (PCIe bus) by DMA without a process of the CPU 101 (step S403). Such reading of the transmission frame is performed based on the frame transfer source address and the frame length set in the descriptor entry described above.

Figure 19:
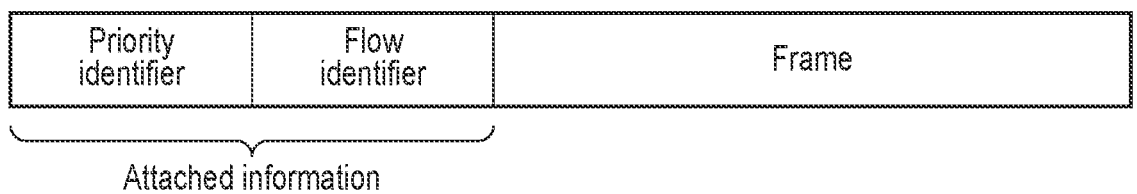
FIG. 19 is a diagram illustrating an example of attached information set in the transmission frame.

The transmission frame read from the system memory in this manner is set with the attached information and output to the encryption determination unit 209 (step S404). Note that FIG. 19 illustrates an example of the attached information set in the transmission frame. In the example illustrated in FIG. 19, the attached information includes a priority identifier indicating the priority of the transmission frame and a flow identifier for identifying a flow to which the corresponding transmission frame belongs. As illustrated in FIG. 19, the attached information is added to the head of the transmission frame. That is, the attached information is transmitted in association with the frame.

Referring back to FIG. 16, as a result of the process using the descriptor, information indicating whether the transfer of the transmission frame has been normally completed or the like is written in (a field of) a status included in the descriptor entry, and the status is updated (step S44).

When the process of step S44 is performed, a transfer process completion notification indicating completion of the transfer of the transmission frame (the process instructed by the descriptor) is notified to the communication control unit 219 by an interrupt (step S45). When the result of the process is confirmed with the status included in the corresponding descriptor entry, (the field of) the status of the used descriptor entry is cleared, and the used descriptor entry can be used for transfer of subsequent transmission frames.

Next, the encryption determination unit 209 determines whether the transmission frame is a target of the encryption process (that is, the transmission frame belongs to the flow to be encrypted) (step S46). The process in step S46 is performed based on the attached information set in the transmission frame and the second key management data managed in the key data management unit 214. Specifically, the encryption determination unit 209 extracts the flow identifier from the attached information set in the transmission frame and acquires the encryption method included in the second key management data in association with the flow identifier. When the information related to the encryption process such as "L2 encryption/OTP" is set in the acquired encryption method, the encryption determination unit 209 determines that the transmission frame is a target of the encryption process. Meanwhile, when the flow identifier extracted from the attached information is not set (does not exist) in the second key management data or when the encryption method corresponding to the corresponding flow identifier is not set in the second key management data, the encryption determination unit 209 determines that the transmission frame is not a target of the encryption process.

When it is determined that the transmission frame is a target of the encryption process (YES in step S46), the encryption processing unit 210 performs the encryption process for the transmission frame (step S47).

Hereinafter, the encryption process performed in step S47 is described with reference to FIG. 20. FIG. 20 is a diagram illustrating an example of an internal configuration of the encryption processing unit 210.

As illustrated in FIG. 20, the encryption processing unit 210 includes a key data selection unit 210*a*, an operation unit 210*b*, a read position update unit 210*c*, and an encryption information addition unit 210*d*.

The key data selection unit 210*a* reads (selects) the key data from the first key memory unit 213 based on a flow identifier included in the attached information set in the transmission frame (hereinafter, referred to as a target flow identifier) and the read position of the corresponding target flow identifier in the key data management unit 214 (that is, the read position included in the second key management data in association with the corresponding target flow identifier).

The operation unit 210*b* encrypts the transmission frame by using the key data selected by the key data selection unit 210*a*. This encryption is performed according to an encryption method (encryption method corresponding to the flow identifier) included in the second key management data managed by the key data management unit 214.

Note that the encryption target range differs depending on the encryption method corresponding to the target flow identifier. For example, in a case where the encryption method is L2 encryption, data after the L2 header is encrypted as plain text data. In a case where the encryption method is L3 encryption, data after the L3 header is encrypted as plain text data.

Furthermore, in a case where the one time pad is adopted, encryption is performed by performing an exclusive OR (XOR) operation on plain text data and key data. That is, encrypted data is acquired by performing an XOR operation.

Furthermore, the operation unit 210*b* performs calculation by using the key data and the transmission frame and generates authentication data.

When the process by the operation unit 210*b* is completed, the read position update unit 210*c* updates the corresponding read position so as to advance the read position included in the second key management data by the length of the key data used for encryption in the operation unit 210*b*.

When the process of step S47 is performed as described above, an encryption frame including encrypted data and authentication data is generated.

Next, the key data management unit 214 determines whether the area to which the key data can be newly transferred (that is, a transferable amount of the key data) is, for example, 64 KiB or more based on the write position and the read position included in the second key management data in association with the target flow identifier (step S48).

When it is determined that the transferable amount of key data is 64 KiB or more (YES in step S48), the key data management unit 214 newly issues a key transfer request including the target flow identifier (step S49). When the process of step S49 is performed, the key data transfer process illustrated in FIG. 13 is performed.

Meanwhile, when it is determined that the transferable amount of the key data is not 64 KiB or more (that is, is less than 64 KiB) (NO in step S48), the process of step S49 is not performed.

Next, the encryption information addition unit 210d adds (a field of) encryption information to the encryption frame (step S50). Note that the encryption information includes, for example, an encryption identifier, a flow identifier, an offset, a length, and an authentication code. In this case, for example, before the encryption process is performed, a value obtained by multiplying the buffer size by the number of circulations and adding the read position to the multiplied result is calculated, so that the corresponding calculated value can be set as the offset.

The encryption frame to which the encryption information has been added is output to the transmission frame memory unit 211 with the attached information set. In the following description, the encryption frame output to the transmission frame memory unit 211 is referred to as a transmission frame for convenience.

Here, the transmission frame memory unit 211 sorts the transmission frames based on the priority identifier included in the attached information and sequentially stores the attached information and the transmission frames in a queue prepared for each priority (step S51).

The transmission control unit 212 reads the attached information and the transmission frame from each queue of the transmission frame memory unit 211 and performs transmission control based on the TSN (step S52). In this case, for example, processes such as EST for controlling transmission of a frame by opening and closing a gate based on the priority, Frame Preemption for interrupting transmission of a frame with a low priority and transmitting a frame with a high priority, and Frame Replication for replicating and transmitting a frame are executed by using the attached information and the transmission frame.

When the process in step S52 is performed, the transmission control unit 212 deletes the attached information and outputs the transmission frame to the communication unit 201. The communication unit 201 transmits the transmission frame via the network by executing the process of the communication protocol of the data link layer and the physical layer with respect to the transmission frame output from the transmission control unit 212 (step S53).

According to the frame transmission process described above, it is possible to encrypt the transmission frame by using the key data transferred from the second key memory unit 223 to the first key memory unit 213 by the key data transfer process and transmit the encrypted transmission frame to the other encrypted communication device 20.

When it is determined in step S46 that the transmission frame is not a target of the encryption process (NO in step S46), the processes in steps S47 to S50 are not performed, and the processes of step S51 and subsequent steps are performed.

Figure 21:
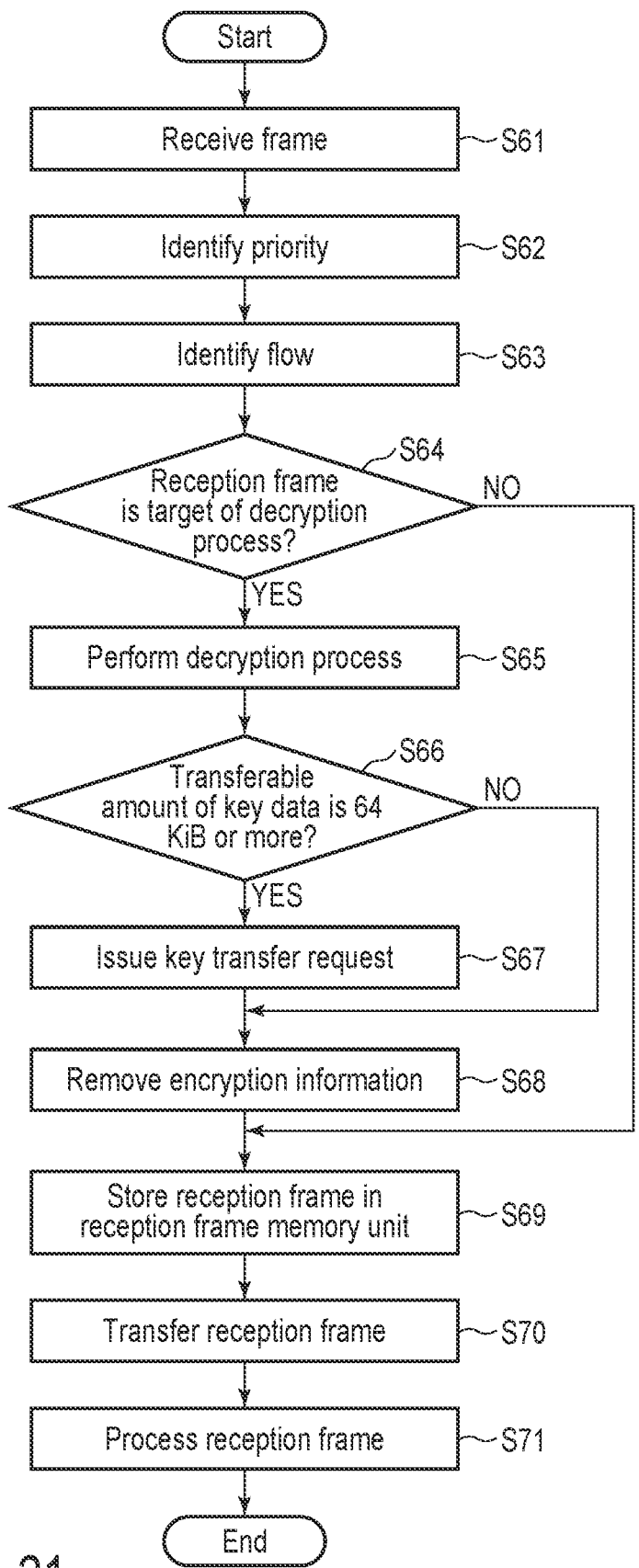
FIG. 21 is a flowchart illustrating an example of a processing procedure of a frame reception process.

Next, an example of a processing procedure of the above-described frame reception process is described with reference to the flowchart of FIG. 21. The encrypted communication device 20 in the description of FIG. 21 is intended as the reception-side encrypted communication device 20b, and the other encrypted communication device 20 is intended as the transmission-side encrypted communication device 20a.

First, the communication unit 201 that performs processes of the physical layer and the data link layer receives a frame transmitted from the other encrypted communication device 20 via the network (step S61). In the following description, the frame received in step S61 is referred to as a reception frame.

Next, the priority identification unit 202 identifies the priority of the reception frame (the priority allocated to the flow to which the reception frame belongs) (step S62). Note that the process in step S62 is performed, for example, based on the value of the priority code point (PCP) of the VLAN defined in IEEE 802.1Q in the frame. The information on the priority identified in step S62 (the priority identifier for identifying the priority) is set as attached information of the reception frame. The value of the PCP of the VLAN can also be used as the priority identifier.

When the process of step S62 is performed, the flow identification unit 203 identifies the flow to which the reception frame belongs (step S63). The process of step S63 (that is, identification of the flow) may be performed by using stream identification defined in IEEE 802.1CB. In this case, the value of the field in the reception frame is used to identify the flow. The values of the fields being received include, for example, a destination MAC address, a transmission source MAC address, a VLAN ID, a destination IP address, a transmission source IP address, DSCP, a transport protocol, a destination port number, a transmission source port number, and the like.

Note that, for example, a value of a stream handle defined by IEEE 802.1CB is used as the flow identifier (information for identifying a flow). In addition, information necessary for flow identification is set in advance in the flow identification unit 203 from the communication application unit 218 via the communication control unit 219. The information necessary for flow identification is, for example, information indicating a correspondence between a combination of values of fields in the reception frame and the flow identifier as illustrated in FIG. 12.

Furthermore, the flow identification unit 203 may identify (recognize) MACsec or an IPsec flow. In this case, the flow is identified using the values of the SCI or AN field of MACsec and the SPI field of IPsec in the reception frame, and the values of the corresponding field or some of the values of the fields are used as the flow identifier.

Information (flow identifier) of the flow identified by the flow identification unit 203 as described above is set as attached information of the reception frame.

Next, the decryption determination unit 205 determines whether the reception frame is a target of the decryption process (that is, the reception frame belongs to the flow to be decrypted) (step S64). The process of step S64 is performed by extracting the flow identifier from the attached information set in the reception frame and acquiring (the information of) the encryption method corresponding to the corresponding flow identifier included in the second key management data managed in the key data management unit 214. Specifically, when information for performing an encryption process such as "L2 encryption/OTP" is registered as the encryption method corresponding to the flow identifier extracted from the attached information, the decryption determination unit 205 determines that the reception frame is a target of the decryption process. Meanwhile, when the flow identifier extracted from the attached information is not set (does not exist) in the second key management data or when (information of) the encryption method corresponding to the corresponding flow identifier is not set in the second key management data, the decryption determination unit 205 determines that the reception frame is not a decryption target.

When it is determined that the reception frame is a target of decryption process (YES in step S64), the decryption processing unit 206 performs the decryption process on the reception frame (step S65).

Figure 22:
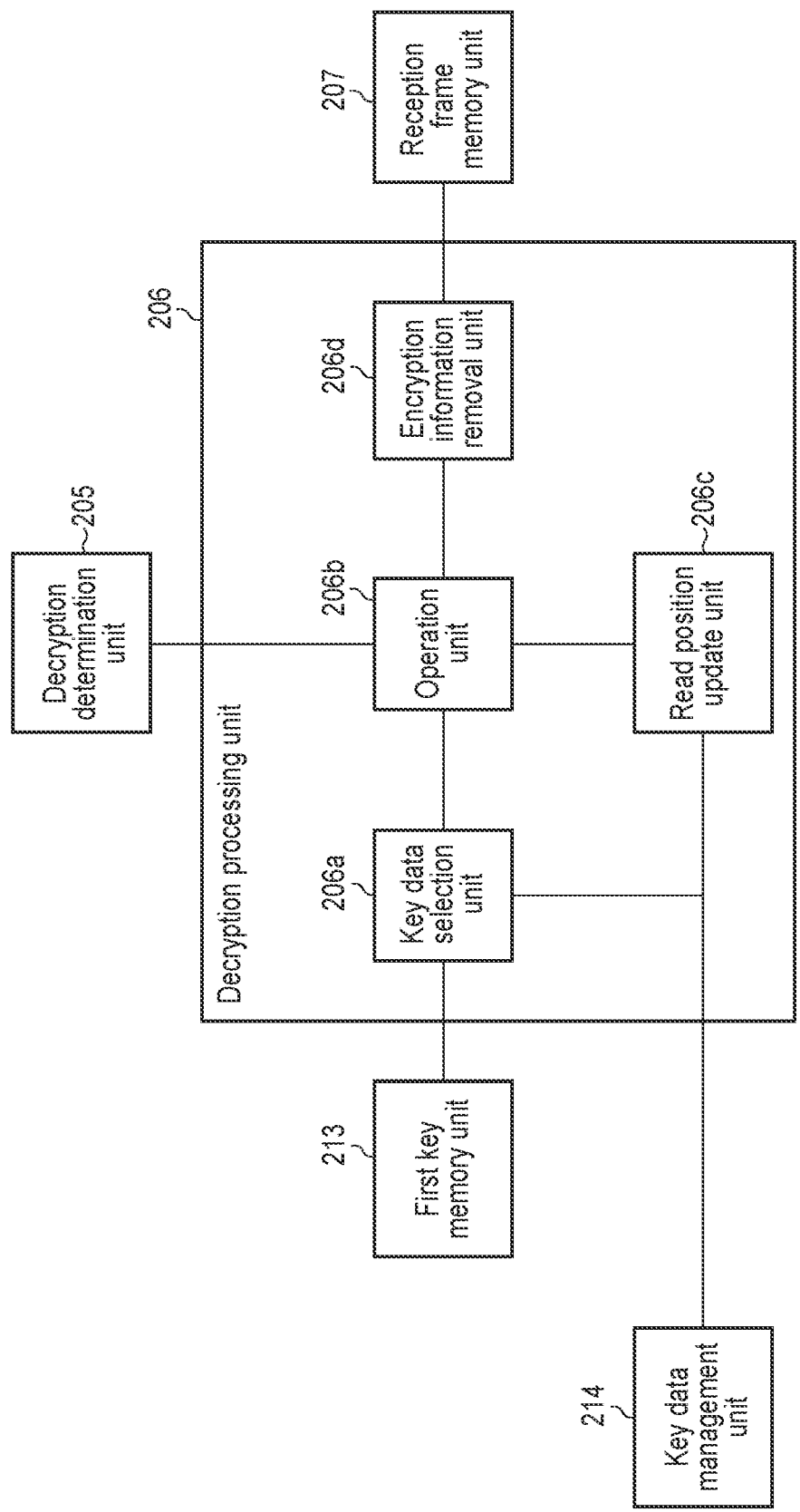
FIG. 22 is a diagram illustrating an example of an internal configuration of a decryption processing unit.

Hereinafter, the decryption process performed in step S65 is described with reference to FIG. 22. FIG. 22 illustrates an example of an internal configuration of the decryption processing unit 206.

As illustrated in FIG. 22, the decryption processing unit 206 includes a key data selection unit 206a, an operation unit 206b, a read position update unit 206c, and an encryption information removal unit 206d.

The key data selection unit 206a reads (selects) the key data from the first key memory unit 213 based on the flow identifier included in the attached information set in the reception frame (hereinafter, referred to as a target flow identifier), the corresponding read position included in the second key management data managed by the key data management unit 214 (read position corresponding to the flow identifier), and the value of the offset included in the reception frame.

Note that the value of the offset included in the reception frame is used to detect a change in the reception order of the frames or a loss of the frame that may occur in the decryption process.

The operation unit 206b decrypts the reception frame by using the key data selected by the key data selection unit 206a. This decryption is performed according to an encryption method (encryption method corresponding to the flow identifier) included in the second key management data managed by the key data management unit 214.

Note that the range to be decrypted differs depending on the encryption method corresponding to this flow identifier, and the operation unit 206b specifies the area of the encrypted data in the reception frame based on (the information of) the corresponding encryption method and performs decryption.

Furthermore, in a case where the one time pad is adopted, decryption is performed by performing an XOR operation on encrypted data and key data. That is, plain text data is acquired by performing an XOR operation.

Further, the operation unit 206b confirms the authentication data included in the encryption information added to the reception frame (encryption frame). In this case, the operation unit 206b performs calculation by using the key data and the reception frame, and if the calculation result does not match the authentication data, it is determined that the frame has been falsified, and the reception frame is discarded.

When the process by the operation unit 206b is completed, the read position update unit 206c updates the corresponding read position so as to advance the read position included in the second key management data by the length of the key data used for decryption in the operation unit 206b (that is, until usage for decryption by the operation unit 206b is completed).

When the process of step S65 is performed as described above, a plain text frame including plain text data is generated.

Next, the key data management unit 214 determines whether the area to which the key data can be newly transferred (that is, a transferable amount of the key data) is, for example, 64 KiB or more based on the write position and the read position included in the second key management data in association with the target flow identifier (step S66).

When it is determined that the transferable amount of key data is 64 KiB or more (YES in step S66), the key data management unit 214 newly issues a key transfer request including the target flow identifier (step S67). When the process of step S67 is performed, the key data transfer process illustrated in FIG. 13 is performed.

Meanwhile, when it is determined that the transferable amount of the key data is not 64 KiB or more (that is, is less than 64 KiB) (NO in step S66), the process of step S67 is not performed.

Next, the encryption information removal unit 206d removes (fields of) encryption information such as the encryption identifier, the flow identifier, the offset, the length, and the authentication code (step S68).

The plain text frame from which the encryption information has been removed is output to the reception frame memory unit 207 with the attached information set. In the following description, the plain text frame output to the reception frame memory unit 207 is referred to as a reception frame for convenience.

Here, the reception frame memory unit 207 sorts the reception frames based on the priority identifier included in the attached information and sequentially stores the attached information and the reception frames in a queue prepared for each priority (step S69).

When detecting that the reception frame is stored (that is, exists) in the reception frame memory unit 207, the frame data transfer unit 208 writes the reception frame in the main memory 102 via the internal bus and transfers the corresponding reception frame (step S70).

Hereinafter, an outline of transfer of a reception frame is described with reference to FIG. 23. First, in the present embodiment, as illustrated in FIG. 23, a reception frame descriptor ring is stored in the system memory (main memory 102), and a reception frame transfer unit 208b in the frame transfer unit 208 is controlled by using the corresponding reception frame descriptor ring. The reception frame descriptor ring has eight descriptor rings corresponding to the channels 0 to 7. Here, it is assumed that (the descriptor ring corresponding to) the channel 7 is used for transferring the reception frame with the highest priority, and (the descriptor ring corresponding to) the channel 0 is used for transferring the reception frame with the lowest priority. The descriptor ring corresponding to each channel has a form of a ring buffer and includes a plurality of descriptor entries.

Note that FIG. 24 illustrates an example of one descriptor entry in the reception frame descriptor ring illustrated in FIG. 23. As illustrated in FIG. 24, the descriptor entry includes a frame transfer destination address, a frame length, a flow identifier, and a status. The frame transfer destination address indicates an address (position) of a system memory in which the reception frame is stored. The frame length indicates a length of a reception frame to be transferred to the frame transfer destination address. The flow identifier indicates a flow to which the reception frame belongs. The status includes information indicating whether the transfer of the reception frame has been normally completed, information indicating whether an error has occurred in the transfer of the reception frame, or the like. At the time of the initialization process or completion of the transfer process, the communication control unit 219 clears the status of each descriptor entry in advance, secures a sufficient area for storing the reception frame in the main memory 102, and sets the head address thereof as the frame transfer destination address.

As illustrated in FIG. 23, the reception frame transfer unit 208b reads the reception frame stored in the reception frame memory unit 207 from the corresponding reception frame memory unit 207 (step S701).

The reception frame transfer unit 208b monitors in which queue existing for each priority the reception frame exists in the reception frame memory unit 207. When there are queues in which reception frames exist, a queue with the highest priority is selected from the queues. Then, the channel for transferring the reception frame is specified based on (the information of) the priority included in the attached information set in the reception frame or (the information of) the priority corresponding to the queue. In this case, the reception frame transfer unit 208b can use a channel to which the same number as the priority included in the attached information is allocated.

Here, as described above, the transfer of the frame and the transfer of the key data are arbitrated by the priority arbitration unit 217. When the transfer of the reception frame is permitted by the priority arbitration unit 217, the reception frame transfer unit 208b writes the reception frame read from the reception frame memory unit 207 to the position designated by the frame transfer destination address of the descriptor entry of the system memory by DMA (step S702).

Next, the reception frame transfer unit 208b sets the descriptor entry of the descriptor ring corresponding to the specified channel (step S703). In this case, the reception frame transfer unit 208b sets (the fields of) the frame length and the flow identifier. Further, the reception frame transfer unit 208b sets, as a result of the process using the descriptor, information indicating whether the transfer of the reception frame has been normally completed, and the like in (the field of) the status.

Note that, when the transfer of the reception frame described above (the process instructed by the descriptor) is completed, a transfer process completion notification is notified to the communication control unit 219 by an interrupt. In this case, the communication control unit 219 refers to the status field of the descriptor entry of each channel to specify the descriptor entry transferred by the reception frame transfer unit 208b and instructs the communication control unit 219 to perform the process of the descriptor ring, the descriptor entry of which has been set, by using the channel number (number allocated to the channel) or the descriptor number (number allocated to the descriptor) (step S704).

When detecting the transfer process completion notification, the communication control unit 219 refers to the status field of the descriptor entry of the channel to specify the descriptor entry transferred by the reception frame transfer unit 208b, refers to the descriptor entry to specify the position of the reception frame written in the system memory from the frame transfer destination address and the frame length, reads the reception frame from the system memory, and outputs the reception frame to the communication application unit 218 (step S705). At this time, the flow identifier may be simultaneously acquired. Note that, when the result of the process is confirmed with the status included in the corresponding descriptor entry, (the field of) the status of the used descriptor entry is cleared, and the used descriptor entry can be used for transfer of subsequent reception frames. Then, the communication control unit 219 notifies the reception frame transfer unit 208b of the completion of the process of the corresponding descriptor entry by using the channel number (number allocated to the channel) and the descriptor number (number allocated to the descriptor entry).

Referring back to FIG. 21, the communication application unit 218 executes a process of the reception frame (communication data) output from the communication control unit 219 (step S71).

According to the frame reception process described above, it is possible to decrypt the reception frame by using the key data transferred from the second key memory unit 223 to the first key memory unit 213 by the key data transfer process and process the decrypted reception frame by the communication application unit 218.

As described above, the network interface 104 (communication control device) according to the present embodiment acquires a frame (data) transmitted from the encrypted communication device 20 (first communication device) to the other encrypted communication device 20 (second communication device) via the network or a frame (data) transmitted from the corresponding other encrypted communication device 20 to the corresponding encrypted communication device 20, performs an encryption process or a decryption process for the corresponding frame by using key data when the acquired frame belongs to a flow to be encrypted or decrypted, requests transfer of key data for each flow via the internal bus of the encrypted communication device 20, and stores the key data transferred in response to the corresponding request in the first key memory unit 213.

In the present embodiment, the internal bus includes a PCIe bus, and the key data is transferred from the host (the CPU 101 and the main memory 102) configuring the encrypted communication device 20.

In the present embodiment, with such a configuration, in a case where an encryption communication method in which keys (data) are sequentially switched is used, key data is transferred from the host to the network interface 104 in advance, whereby low-delay communication can be realized.

In the present embodiment, the transfer of the key data is requested based on the second key management data (management data for managing the key data stored in the first key memory unit 213) managed in the key data management unit 214. Furthermore, the transfer of the key data is controlled based on the priority allocated to the flow to which the frame belongs. Further, in the present embodiment, the transfer of the corresponding key data is requested based on the data amount (for example, the transferable amount) of the key data stored in the first key memory unit 213. Furthermore, in the present embodiment, transfer of key data longer than key data used for performing one encryption process or decryption process for a frame is required.

In the present embodiment, with such a configuration, it is possible to efficiently transfer key data for realizing the above-described low-delay communication.

Figure 25:
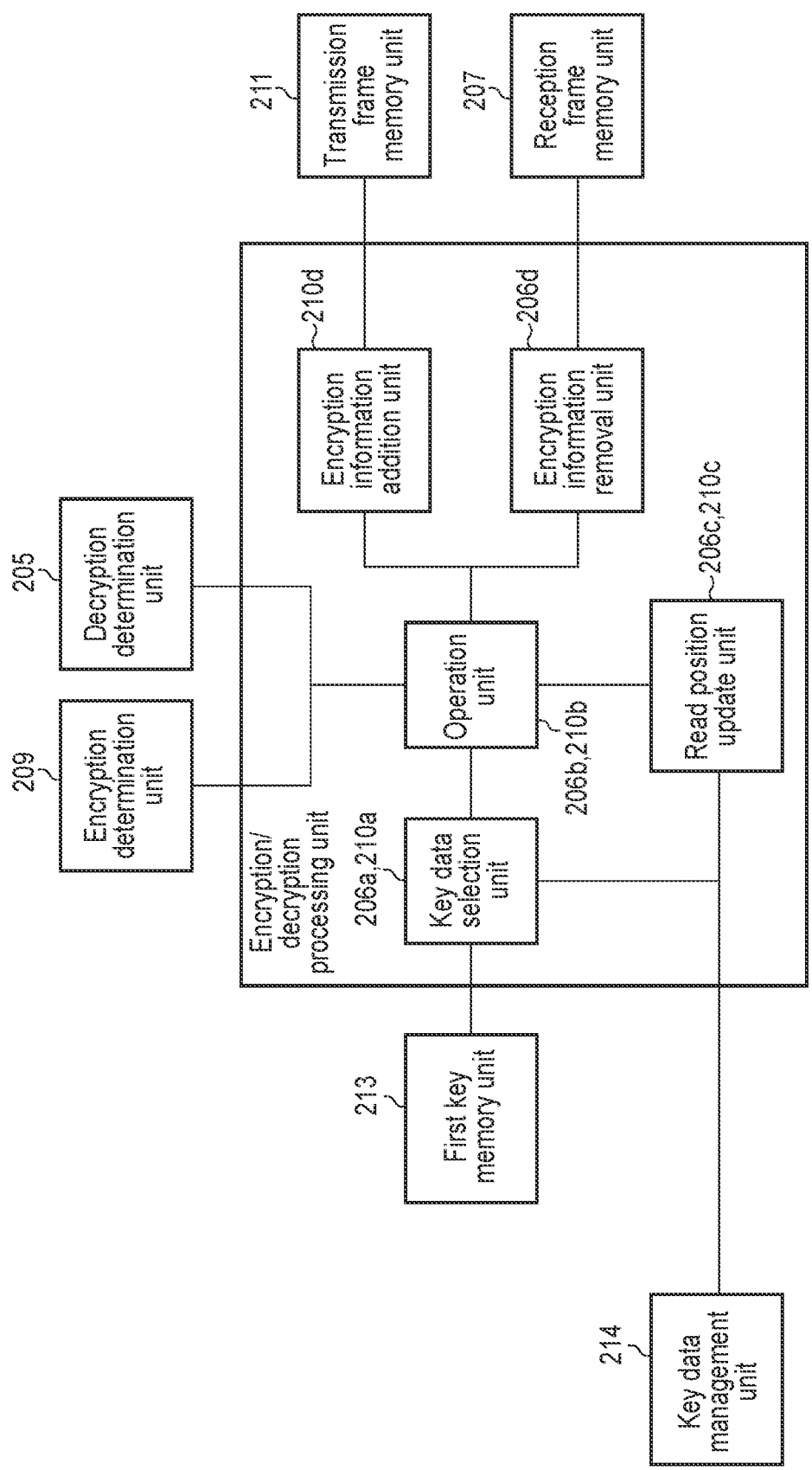
FIG. 25 is a diagram illustrating an example of an internal configuration of an encryption/decryption processing unit.

Note that, in the present embodiment, the encryption processing unit 210 illustrated in FIG. 20 and the decryption processing unit 206 illustrated in FIG. 22 are described as separate processing units, but the respective units 210a to 210c illustrated in FIG. 20 and the respective units 206a to 206c illustrated in FIG. 22 have common functions, and thus the corresponding encryption processing unit 210 and the corresponding decryption processing unit 206 may be integrally configured like the encryption/decryption processing unit illustrated in FIG. 25. The encryption processing unit 210, the decryption processing unit 206, and the encryption/ decryption processing unit can all be referred to as a cryptographic processing unit.

Further, in the present embodiment, the configuration in which the key data is directly acquired from the QKD device 10 has been described, but a configuration in which the key data acquired from the QKD device 10 is stored in the storage 103 connected to the expansion bus 106 and the key data is acquired from the storage 103 (that is, the key data acquired from the storage 103 is stored in the second key memory unit 223 of the host) may be adopted. In this case, the key management application unit 220 may manage a file name of the key data stored in the storage 103, a position of the corresponding key data in the storage 103, information of the transferred (used) key data (information indicating how much the key data has been read), and the like. According to this, the key management application unit 220 can read the key data from the storage 103 to the second key memory unit 223 by instructing the key acquisition unit 221 according to the transfer status (usage status) of the key data, and can transfer the key data from the corresponding second key memory unit 223 (that is, the host) to the first key memory unit 213 (that is, the network interface 104).

Hereinafter, other modifications of the present embodiment are described. Here, first to third modifications are described.

First, a first modification is described with reference to FIG. 26. FIG. 26 is a block diagram illustrating an example of a functional configuration of the encrypted communication device 20 according to the first modification. In FIG. 26, the same portions as those in FIG. 3 described above are denoted by the same reference numerals, and a detailed description thereof is omitted. Here, portions different from those in FIG. 3 are mainly described.

As illustrated in FIG. 26, the encrypted communication device 20 according to the first modification includes a decryption determination unit 224 (second decryption determination unit), a decryption processing unit 225 (second decryption processing unit), an encryption determination unit 226 (second encryption determination unit), and an encryption processing unit 227 (second encryption processing unit) as functional units realized by the host.

The decryption determination unit 224 and the decryption processing unit 225 are functional units similar to the decryption determination unit 205 (first decryption determination unit) and the decryption processing unit 206 realized by the network interface 104. The decryption processing unit 225 performs the decryption process by using the key data stored in the second key memory unit 223.

The encryption determination unit 226 and the encryption processing unit 227 are functional units similar to the encryption determination unit 209 (first encryption determination unit) and the encryption processing unit 210 (first encryption processing unit) realized by the network interface 104. The encryption processing unit 227 performs the encryption process by using the key data stored in the second key memory unit 223.

According to the first modification described above, it is possible to realize a configuration in which the decryption process and the encryption process of the frame belonging to the flow in which the decryption process and the encryption process are not performed on the network interface 104 side are performed on the host side. Note that the flow for performing the decryption process and the encryption process on the network interface 104 (or the host) side may be determined in advance, for example, by using a flow identifier or the like.

Note that the processes (the decryption process and encryption process) performed on the network interface 104 side has a low delay, but there may be an upper limit on the number of flows that can be processed by the corresponding network interface 104. In such a case, for example, a process for a frame belonging to a flow with high priority is executed on the network interface 104 side, and a process for a frame belonging to the other flow is performed on the host side (that is, the process related to the encrypted communication is shared), whereby the encrypted communication device 20 can be efficiently operated.

Furthermore, for example, in a case where an error occurs (that is, decryption or encryption cannot be performed on the network interface 104 side) in the decryption process or the encryption process executed on the network interface 104 side due to a delay in the transfer of the key data from the host (second key memory unit 223) to the network interface 104 (first key memory unit 213), the decryption process or the encryption process using the key data stored in the second key memory unit 223 may be performed on the host side. In this case, the decryption determination unit 224 or the encryption determination unit 226 may be notified that the decryption process or the encryption process is to be performed by a frame, an interruption, or the like.

Next, a second modification is described with reference to FIG. 27. FIG. 27 is a block diagram illustrating an example of a functional configuration of the encrypted communication device 20 according to the second modification. In FIG. 27, the same portions as those in FIG. 3 described above are denoted by the same reference numerals, and a detailed description thereof is omitted. Here, portions different from those in FIG. 3 are mainly described.

In the present embodiment, a configuration in which a frame generated in a host (communication application unit 218) connected to the network interface 104 is transmitted to the other encrypted communication device 20 or a frame processed in the corresponding host (communication application unit 218) is received from the other encrypted communication device 20 is described, but the encrypted communication device 20 according to the second modification is configured to transfer a frame received from the other device (electronic device) to the other device.

In this case, the encrypted communication device 20 according to the second modification operates, for example, to set a frame (plain text frame) received from the first device (communication application unit) as a transmission frame, encrypt the corresponding transmission frame, and transmit the corresponding encrypted transmission frame to the second device (communication application unit). Also, the encrypted communication device 20 according to the second modification operates, for example, to set a frame (encryption frame) received from the first device (communication application unit) as a reception frame, decrypt the corresponding reception frame, and transmit the corresponding decrypted reception frame (plain text frame) to the second device (communication application unit).

In other words, in a case where the communication application unit is included in the other device, the encrypted communication device 20 according to the second modification can be regarded as an encryption processing device that performs decryption or encryption on a frame received from the corresponding other device. Note that the other device including the communication application unit is connected to the encrypted communication device 20 via the communication unit 201 via a network.

Furthermore, in a case where the communication application unit is included in the other device, the encrypted communication device 20 according to the second modification also becomes an encryption processing device that performs both decryption or encryption on a frame received from the corresponding other device. This can be used, for example, in a configuration to relay communications using different keys. In this case, the setting may be performed via the communication control unit 219, and the header of the frame may be rewritten by the transmission control unit 212.

Note that the encrypted communication device 20 according to the second modification can be realized in a mode such as a communication device or network device used by connecting to an Ethernet port provided in the other device including a communication application unit, for example.

In the second modification, the encrypted communication device 20 includes a communication setting unit 228 instead of communication application unit 218 as a functional unit realized by the host.

The communication setting unit 228 receives a setting from the communication application unit 218 of the other device via the communication unit 201 and sets the key management application unit 220 and the communication control unit 219.

Figure 28:
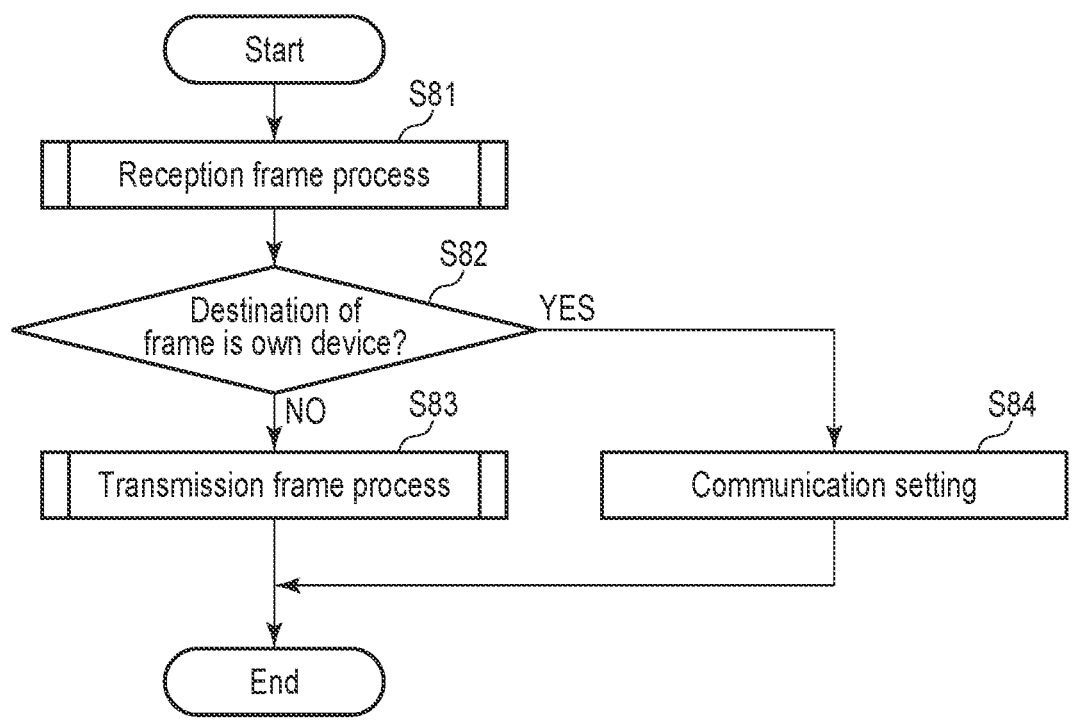
FIG. 28 is a flowchart illustrating an example of a processing procedure of the encrypted communication device according to the second modification of the present embodiment.

Hereinafter, an example of a processing procedure of the encrypted communication device 20 according to the second modification is described with reference to the flowchart of FIG. 28.

First, in a case where a frame is transmitted from the other device including the communication application unit to the encrypted communication device 20, the reception frame process is performed (step S81). Note that the reception frame process corresponds to the process of steps S61 to S69 illustrated in FIG. 21 described above.

Next, the frame transfer unit 208 determines whether the destination of the frame for which the reception frame process has been performed in step S81 is the encrypted communication device 20 (that is, the own device) (step S82). In the determination process, in a case where the destination MAC address of the frame matches the MAC address of the own device, it may be determined that the destination is the own device. In addition, in the case of broadcast or multicast, it may be determined that the destination is the own device.

When it is determined that the destination of the frame is not the own device (NO in step S82), the frame transfer unit 208 directly outputs (transfers) the frame received from the reception frame memory unit 207 to the encryption determination unit 209 without the internal bus, and the transmission frame process is performed (step S83). Note that the transmission frame process corresponds to a process of encrypting the frame on which the reception frame process has been performed in step S81 and transferring the encrypted frame to the other device. Specifically, in step S83, for example, the processes of steps S46 to S53 illustrated in FIG. 16 are performed.

That is, in the second modification, when a frame transmitted from the other device is addressed to the other device (not the own device), an operation combining the frame reception process (decryption of the frame) and the frame transmission process (encryption of the frame) in the present embodiment described above is performed.

Meanwhile, in a case where it is determined in step S82 that the destination of the frame is the own device (YES in step S82), the frame transfer unit 208 writes the frame received from the reception frame memory unit 207 into the main memory 102 via the internal bus and transfers the corresponding reception frame, thereafter, the same processes are performed as in S701 to S705, and the frame is passed to the communication setting unit 228 instead of the communication application unit 218. The communication setting unit 228 receives the corresponding frame (setting from the communication application unit of the other device) and performs setting (that is, communication setting) of the communication control unit 219, the key management application unit 220, and the like (step S84).

According to the second modification described above, for example, a configuration in which the communication application unit is separated into other devices (devices other than the encrypted communication device 20) can be realized.

Although omitted in FIG. 27, in the second modification, the number of communication units 201 (the number of ports) may be plural, or a plurality of ports may be virtually realized by VLANs.

Figure 29:
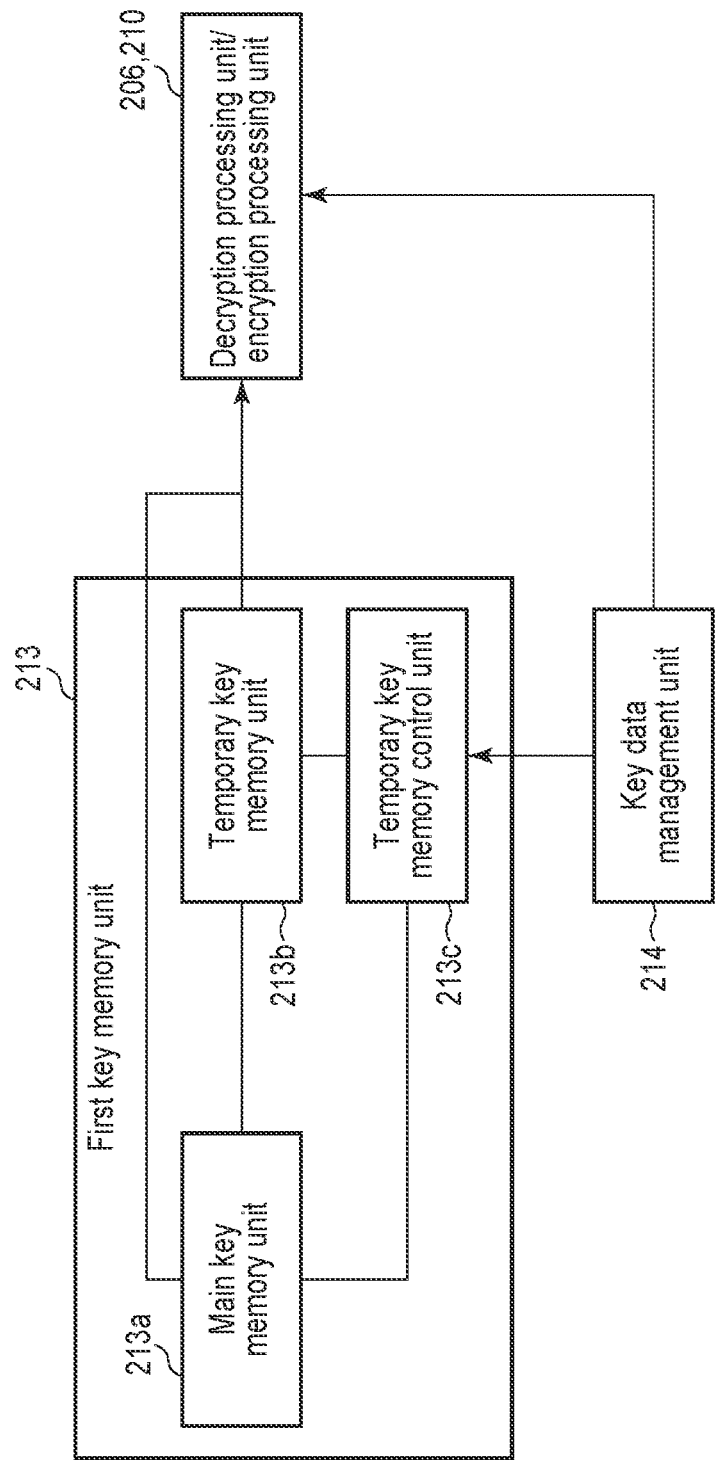
FIG. 29 is a diagram illustrating a third modification of the present embodiment.

Next, a third modification is described with reference to FIG. 29. FIG. 29 illustrates an example of an internal configuration of the first key memory unit 213 included in the encrypted communication device 20 according to the third modification.

As illustrated in FIG. 29, the first key memory unit 213 includes a main key memory unit 213a realized, for example, by a DRAM and a temporary key memory unit 213b realized by, for example, an SRAM.

In this case, the main key memory unit 213a stores the key data in the area of 128 KiB prepared for each flow as described in the present embodiment. Meanwhile, the temporary key memory unit 213b stores key data used for a decryption process or an encryption process (that is, one decryption process or encryption process) for one frame (communication transfer unit) in an area of about 1500 Bytes prepared for each flow. When it is assumed that decryption or encryption is performed by using key data having the same size as the communication data (encrypted data or plain text data) as described above, key data used for the decryption or the encryption differs depending on the size of (the encrypted data or the plain text data included in) the frame, but key data (that is, the key data corresponding to the maximum size) having the same size as the maximum size of the encrypted data or the plain text data is stored in the temporary key memory unit 213b.

Note that, for example, the maximum size of the encrypted data is calculated from the maximum size of one frame (communication transfer unit). Specifically, for example, the maximum size of the encrypted data corresponds to a size of data obtained by subtracting the number of bytes of the header areas of L2 and L3 and the field of the encryption information from a maximum transmission unit (MTU) or a queueMaxSDU that is a maximum size of a service unit defined for each queue. In addition, in a case where the key data is used for generating the authentication data described above, in addition to the key data having the same size as the maximum size of the encrypted data described above, key data for use in generating the authentication data may also be written in the temporary key memory unit 213b.

Also, the first key memory unit 213 further includes a temporary key memory control unit 213c. The temporary key memory control unit 213c performs a process of reading key data from the main key memory unit 213a for each flow and writing (storing) the corresponding key data in the temporary key memory unit 213b in accordance with the update of the read position in the key data management unit 214 (second key management data). That is, the key data to be used for the next frame transmission is first read and cached.

Since it is necessary to read key data (key data corresponding to the maximum size) to be written in the temporary key memory unit 213b from the main key memory unit 213a, the key data management unit 214 may have an interface for setting the size of the corresponding key data (the maximum size of the encrypted data).

In the third modification described above, key data is acquired not from the main key memory unit 213a realized by the DRAM but from the temporary key memory unit 213b realized by the SRAM that can be accessed with a lower delay than the corresponding DRAM and used for decryption or encryption, so that it is possible to realize high speed (low delay) of a process related to decryption or encryption in the encrypted communication device 20 (network interface 104).

Second Embodiment

Next, a second embodiment is described. Although the configuration in which the key data is transferred from the host (the CPU and the main memory) to the network interface is described in the first embodiment described above, the present embodiment is different from the first embodiment in that the key data is stored in a storage, and also the corresponding key data is directly transferred from the corresponding storage to the network interface.

Note that the outline of the communication system and the configuration of the encrypted communication device in the present embodiment are similar to those of the first embodiment described above and thus is appropriately described with reference to FIGS. 1 and 2.

FIG. 30 is a block diagram illustrating an example of a functional configuration of the encrypted communication device 20 according to the present embodiment. In the first embodiment described above, the description is made that the second key memory unit 223 is a functional unit realized by the host, and the key data transfer unit 215 is a functional unit realized by the network interface 104, but in the present embodiment, the second key memory unit 223 and the key data transfer unit 215 are functional units realized by the storage 103. In the present embodiment, the storage 103 includes a solid state drive (SSD), and the storage area of the second key memory unit (second key storage unit) 223 is secured in the SSD. Also, the key data transfer unit 215 is realized by a DMA controller or the like provided in an SSD (storage).

In the first embodiment described above, the description is made that the priority arbitration unit 217 is a functional unit realized by the network interface 104, but in the present embodiment, the priority arbitration unit 217 is a functional unit realized by the host. Furthermore, in the present embodiment, a file management unit 229 is further included as a functional unit realized by the host. In the present embodiment, it is not necessary to prepare the second key memory unit 223 as a functional unit realized by the host.

The file management unit 229 is realized by a function such as a file system operating on the OS, manages a storage area of the second key memory unit 223, and provides an interface for realizing writing and reading of data with a file name. With such a file management unit 229, the key data acquired by the key acquisition unit 221 is managed as a file.

The key management application unit 220 may manage a location of the key data stored in the second key memory unit 223, for example, by a file name. As the file name, for example, a QKD key identifier may be used. In a case where acquisition of key data is instructed from the key management application unit 220, the key acquisition unit 221 acquires key data from the QKD device 10 and stores the key data in a designated file. The file storing the key data is written into the second key memory unit 223 by the file management unit 229.

Further, the key data receiving unit 216 according to the present embodiment includes a setting interface and has a function of deleting (removing) data from the head data to the valid data offset for each flow in the key data transferred from the storage 103 (second key memory unit 223) and extracting data having the valid data length from which the data has been deleted. In the present embodiment, the key data receiving unit 216 receives the transfer of the key data by memory mapped I/O.

Hereinafter, the operation the encrypted communication device 20 according to the present embodiment is described. The encrypted communication device 20 according to the present embodiment performs a transmission-side setting process, a reception-side setting process, a key data transfer process, a frame transmission process, and a frame reception process similarly to the first embodiment described above, but processes other than the key data transfer process are similar to those of the first embodiment, and thus detailed description thereof is omitted here.

Figure 31:
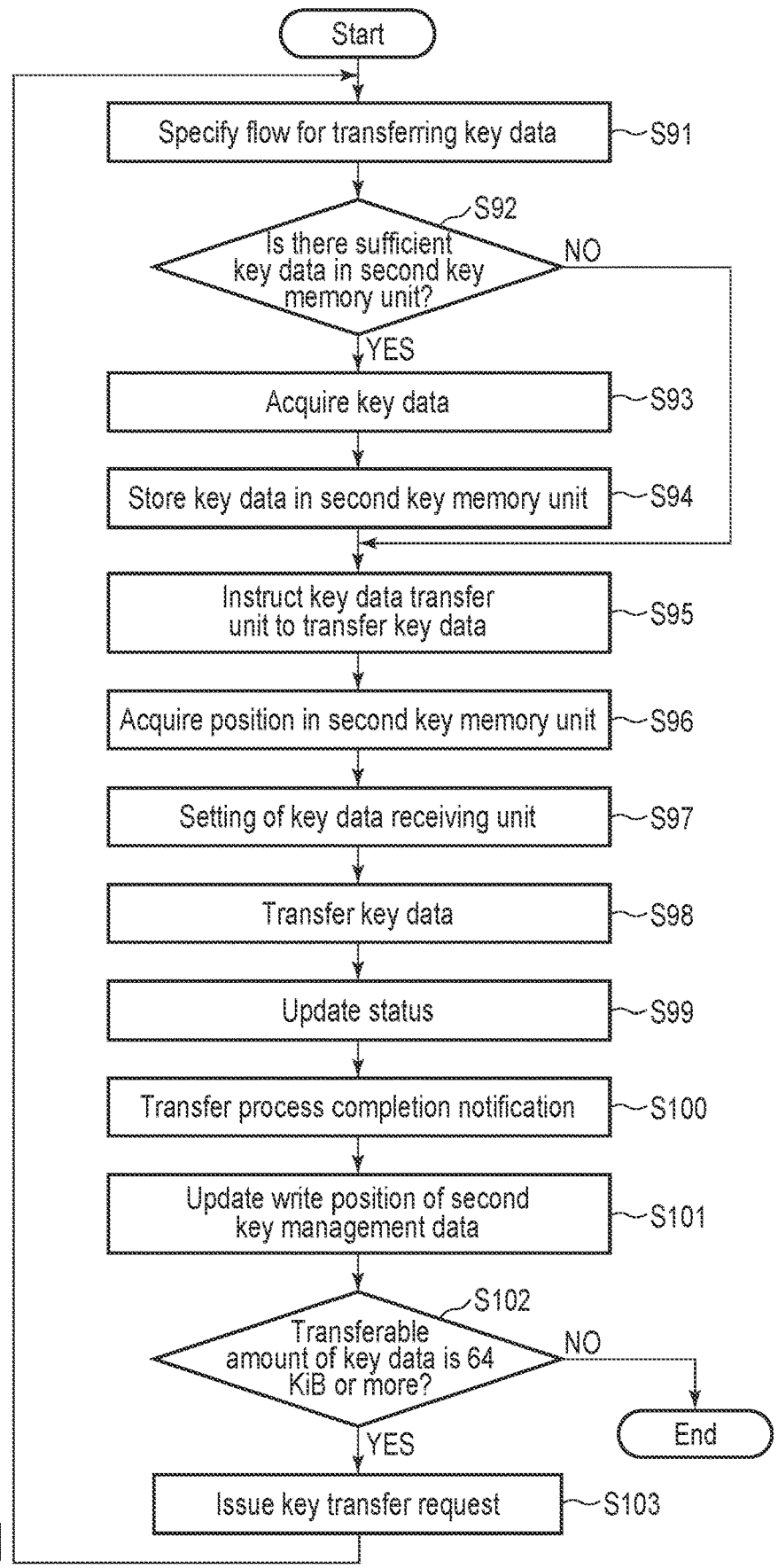
FIG. 31 is a flowchart illustrating an example of a processing procedure of a key data transfer process.

Next, an example of a processing procedure of the key data transfer process is described with reference to the flowchart of FIG. 31. Here, differences from FIG. 13 described above are mainly described.

Figure 13:
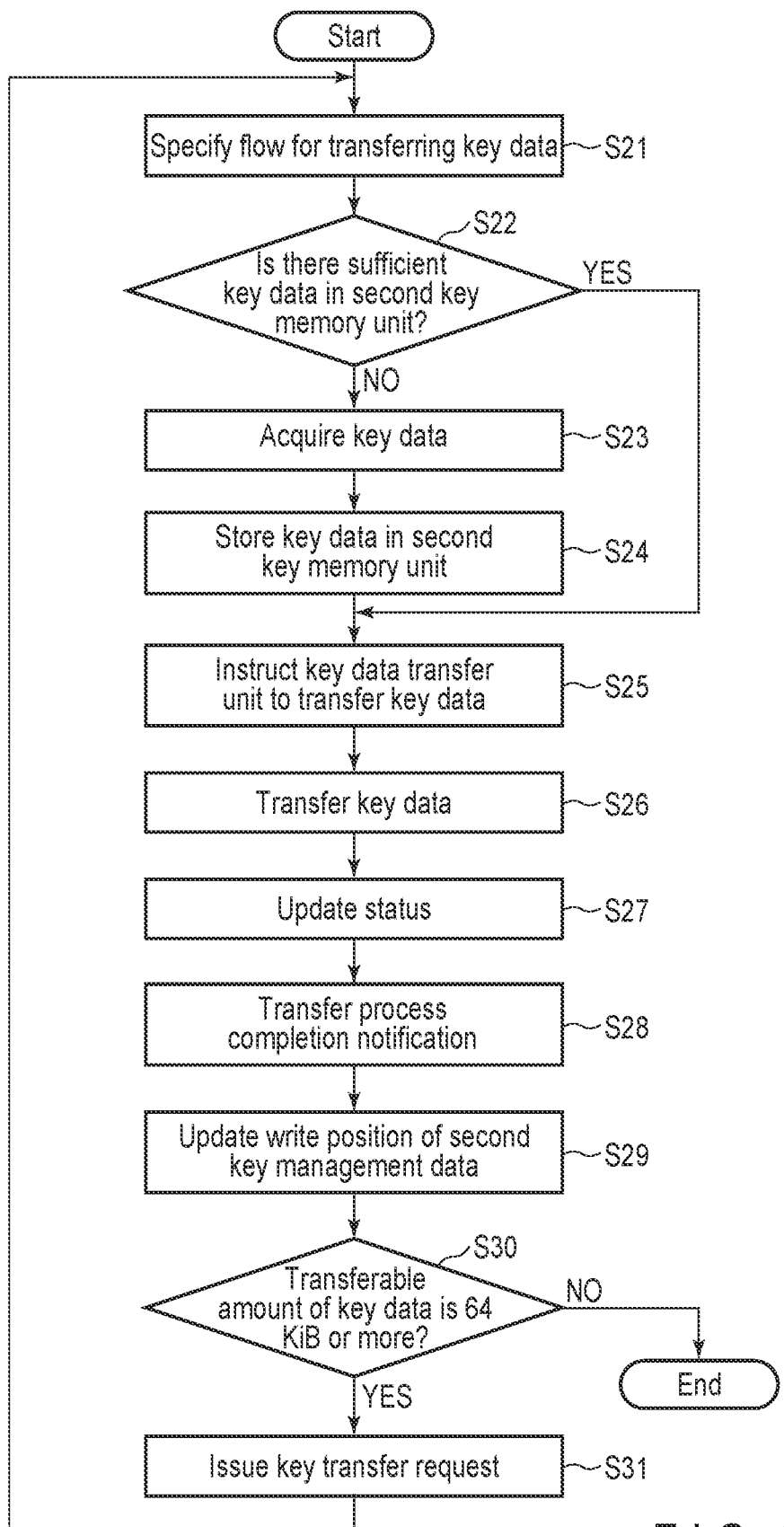
FIG. 13 is a flowchart illustrating an example of a processing procedure of a key data transfer process.

First, the processes of steps S91 to S94 corresponding to the processes of steps S21 to S24 illustrated in FIG. 13 described above are performed. Note that the key data in the present embodiment is stored in the second key memory unit 223 as a file.

Next, the key management application unit 220 instructs the key data transfer unit 215 to transfer the key data via the key transfer control unit 222 (step S95).

Here, according to the present embodiment, the key management application unit 220 manages the key data stored in the second key memory unit 223 by using the first key management data illustrated in FIG. 32. The first key management data in the present embodiment is different from the first key management data illustrated in FIG. 5 described above in that the address is a file name. The key management application unit 220 refers to such first key management data and instructs the file name of the file storing the key data of the flow (target flow) specified in step S91, the offset (position from the head of the file) at which the transfer is started, and the length of the key data to be transferred.

The key transfer control unit 222 acquires the position in the second key memory unit 223 based on the instruction from the key management application unit 220 (step S96). When the file management unit 229 gives the file name, the key transfer control unit 222 may acquire the position of one or a plurality of data blocks in the second key memory unit 223 from the offset and the length of the key data instructed from the key management application unit 220 in order to respond to the extent (information of continuous data blocks represented by a set of the head position and the length) configuring the file to which the file name is allocated.

In this case, since the data transfer from the storage 103 (the second key memory unit 223) such as the SSD is performed not in byte units but in sector units, the key transfer control unit 222 calculates a read start position in sector units and a length of data read from the read start position in sector units, a start position (offset) of valid data among the data read in sector units, and a valid data length (that is, the data length of the key data to be transferred)

from the corresponding start position based on the extent information configuring the file, the first key management data (transferred data size), and the like.

Next, the key transfer control unit 222 sets the start offset of the valid data and the length of the valid data (that is, the valid data length) from the start offset in the key data receiving unit 216 to delete the extra data at the head and the tail when the key data is transferred in sector units (that is, to acquire valid data from the key data transferred in sector units) (step S97).

Here, FIG. 33 illustrates an example of an interface of the key data receiving unit 216. In the example illustrated in FIG. 33, the interface of the key data receiving unit 216 includes a setting interface that sets a start offset of valid data, a valid data length, and a data write destination address of the first key memory unit 213 for each channel (each key transfer channel) used for key data transfer. In addition, the interface of the key data receiving unit 216 includes an interface that writes data in the data write area of each channel.

When writing the data from the key data transfer unit 215 to (the address indicating) the data write area of each channel, the key data receiving unit 216 can output, in byte units, data from which an unnecessary portion is deleted based on the valid data start offset and the valid data length set for the channel.

Note that the description is made here that the data write destination address of the first key memory unit 213 is set for each channel, but a flow identifier may be set instead of the data write destination address. In this case, when the key data is written into the first key memory unit 213, the data write destination address may be calculated by using the flow identifier.

When the process in step S97 is performed, the key transfer control unit 222 sets the descriptor and instructs the key data transfer unit 215 to transfer the key data, and the key data transfer unit 215 transfers the key data from the second key memory unit 223 (that is, the storage 103) to the first key memory unit 213 (that is, the network interface 104) (step S98).

Here, in the case of the configuration using the key data transfer unit 215 of the storage 103 as in the present embodiment, the descriptor entry configuring the key transfer descriptor ring is different from that of the first embodiment described above.

Figure 34:
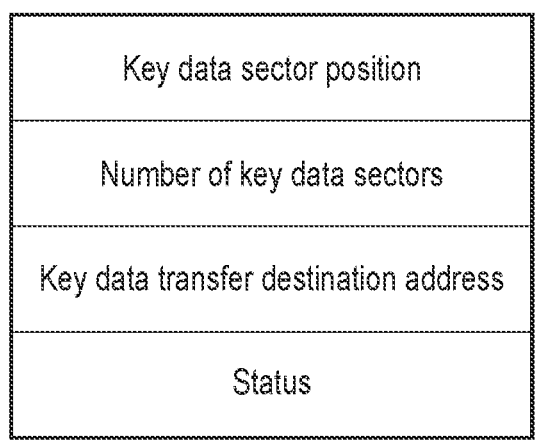
FIG. 34 is a diagram illustrating an example of a descriptor entry in a key transfer descriptor ring.

FIG. 34 illustrates an example of a descriptor entry in the present embodiment. As illustrated in FIG. 34, the descriptor entry includes a key data sector position, the number of key data sectors, a key data transfer destination address, and a status. The key data sector position indicates a sector position of key data (key data transferred from the second key memory unit 223) stored in the second key memory unit 223. The number of key data sectors indicates the number of sectors of the key data stored in the second key memory unit 223. The key data transfer destination address indicates the head address when the key data transfer unit 215 writes the key data and corresponds to the head address of the data write area prepared for each channel in the setting interface of the key data receiving unit 216. The status is as described in the first embodiment described above.

The key transfer control unit 222 sets the read start position in sector units and the length of data read from the corresponding start position in sector units obtained by the above-described process in the key data sector position and the key data of the descriptor entry, respectively. In addition, the head address of the data write area corresponding to the channel to be used is designated as the key data transfer destination address. Also, the key data transfer unit 215 is instructed to perform the process (transfer process of the key data) of the descriptor ring, the descriptor entry of which has been set, by using the channel number (number allocated to the channel) and the descriptor number (number allocated to the descriptor).

In this case, when the transmission in the channel instructed to transfer is permitted by the priority arbitration unit 217, the key data transfer unit 215 reads the key data from the second key memory unit 223 in sector units based on the information on the key data sector position and the number of key data sectors of the descriptor, and writes the key data in the data write area set in (the setting interface of) the key data receiving unit 216 designated by the key data transfer destination address of the descriptor entry.

The key data receiving unit 216 deletes the head and tail (that is, unnecessary data) of the data written in sector units for each channel by using the valid data start offset and the valid data length set for each channel. The key data receiving unit 216 sequentially writes the data (that is, the key data for each channel) after the unnecessary data is deleted to the data write destination address of the designated first key memory unit 213 in byte units.

When the processes of step S98 described above is completed, the processes of steps S99 to S103 corresponding to the processes of steps S27 to S31 illustrated in FIG. 13 described above are performed.

As described above, in the present embodiment, the key data is transferred from the storage 103 (storage device) configuring the encrypted communication device 20 to the network interface 104. The key data in the present embodiment is transferred by DMA without the process by the CPU 101 as in the first embodiment described above.

In the present embodiment, since data is read from the second key memory unit 223 (storage 103) in sector units, the first key memory unit 213 stores key data extracted from data transferred from the corresponding storage 103 in sector units (that is, key data obtained by deleting unnecessary data from data in sector units).

Here, in the configuration in which the key data is stored in the storage 103 described in the first embodiment above, the host acquires the key data from the corresponding storage 103 and the corresponding key data is transferred from the host to the network interface 104. However, in such a configuration, although a large amount of key data can be stored in the storage 103, the key data is transferred in the order of the storage 103, the host (the CPU 101 and the main memory 102), and the network interface 104, and thus efficiency is low.

On the other hand, in the present embodiment, the key data stored in the storage 103 can be directly transferred to the network interface 104 by the above-described configuration, and thus efficient transfer of the key data can be realized.

Furthermore, in the present embodiment, it is not necessary to store key data on the host side (main memory 102), and thus the capacity of the main memory 102 can be reduced.

Note that the first to third modifications in the first embodiment described above are described, but at least some of the first to third modifications described in the corresponding first embodiment may be applied to the second embodiment.

According to at least one embodiment described above, it is possible to provide a communication control device, a communication device, a communication system, a method, and a program capable of realizing low-delay communication in a case where an encryption communication method for sequentially switching keys is used.

Note that, in each of the above-described embodiments, it is described that the flow identification unit 203 (stream identification unit) is provided as the reception-side network interface (the function of the reception-side encrypted communication device 20b), but a flow identification unit as a transmission-side network interface may be provided. In this case, similarly to the flow identification unit 203 of the reception-side network interface, the communication application unit 218 may perform setting in advance for the flow identification unit of the transmission-side network interface. In this case, the flow identifier obtained by the flow identification unit 203 is set as the flow identifier of the attached information.

Further, in each of the above-described embodiments, the description is made that the key transfer request is issued in a case where the transferable amount of key data is equal to or more than a certain value (for example, 64 KiB), but the corresponding key transfer request may be issued, for example, in a case where the remaining amount of key data stored in the first key memory unit 213 is equal to or less than a certain value. That is, each embodiment may be configured to request the transfer of the key data based on the key data amount stored in the first key memory unit 213.

Furthermore, in each of the above-described embodiments, the description is mainly made that the one time pad is used as the encryption communication method (encryption method), but the Advanced Encryption Standard (AES) or the like may be used instead of the one time pad. That is, each of the above-described embodiments may be applied to, for example, an encryption communication method in which a key is changed (switched) every certain number of times or every certain time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication control device included in a first communication device, the communication control device comprising:
    a first memory; and
    a circuit configured to:
    acquire data transmitted from the first communication device to a second communication device or data transmitted from the second communication device to the first communication device, via a network;
    perform an encryption process or a decryption process on the data by using key data in a case where the data belongs to a flow of communication between the first communication device and the second communication device to be encrypted or decrypted;
    sequentially transfer key data in advance for each flow via an internal bus of the first communication device; and
    store key data transferred in response to a request to the first memory,
    wherein the circuit is configured to transfer key data based on the area to which key data can be transferred in the first memory.

2. The communication control device according to claim 1, wherein the internal bus includes a PCI Express (PCIe) bus.

3. The communication control device according to claim 2, wherein the key data is transferred from a host or a storage included in the first communication device.

4. The communication control device according to claim 3, wherein the key data is transferred by direct memory access (DMA).

5. The communication control device according to claim 4, wherein the first memory stores key data extracted from data transferred from the storage in sector units.

6. The communication control device according to claim 1, wherein the circuit is configured to request transfer of the key data based on key management data for managing the key data stored in the first memory unit.

7. The communication control device according to claim 1, further comprising:
    a second memory that is able to be accessed at a higher speed than the first memory,
    wherein the second memory stores key data used to perform an encryption process or decryption process among the key data stored in the first memory, and
    the circuit is configured to process the encryption process or the decryption process by using the key data stored in the second memory unit.

8. The communication control device according to claim 1, wherein transfer of the key data is controlled based on a priority allocated to a flow to which the data belongs.

9. The communication control device according to claim 1, wherein a host configuring the first communication device is configured to perform an encryption process or a decryption process on data for which the encryption process or the decryption process is not performed in the communication control device.

10. The communication control device according to claim 1, wherein the circuit is configured to request transfer of key data longer than key data used for performing an encryption process or decryption process.

11. The communication control device according to claim 1, wherein the circuit is configured to transfer key data after the encryption process or the decryption process is performed by using key data in the first memory.

12. A communication device comprising a host and a communication control device connected to the host via an internal bus,
    the communication control device including:
    a first memory; and
    a circuit configured to:
    acquire data transmitted to another communication device via a network or data transmitted from another communication device;
    perform an encryption process or a decryption process on the data by using key data in a case where the data belongs to a flow of communication between the first communication device and the second communication device to be encrypted or decrypted;
    sequentially transfer key data in advance for each flow via the internal bus; and
    store key data transferred from the host in response to a request to the first memory,
    wherein the circuit is configured to transfer key data based on the area to which key data can be transferred in the first memory.

13. A communication system comprising a quantum key distribution device configured to generate key data and perform quantum key distribution on the key data, and a communication device including a host and a communication control device connected to the host via an internal bus,
the communication control device including:
a first memory; and
a circuit configured to:
acquire data transmitted to another communication device via a network or data transmitted from another communication device;
perform an encryption process or a decryption process on the data by using key data in a case where the data belongs to a flow of communication between the first communication device and the second communication device to be encrypted or decrypted;
sequentially transfer key data in advance for each flow via the internal bus; and
store key data transferred from the host in response to a request to the first memory,
wherein the circuit is configured to transfer key data based on the area to which key data can be transferred in the first memory.

* * * * *